US 12,512,763 B2

(12) United States Patent
Zade et al.

(10) Patent No.: US 12,512,763 B2
(45) Date of Patent: Dec. 30, 2025

(54) HIGH-BANDWIDTH CONTROL OF UNFOLDING-BASED AC-DC CONVERTERS

(71) Applicants: Aditya Zade, Logan, UT (US); Shubhangi Gurudiwan, Logan, UT (US); Bryce Hesterman, Providence, UT (US); Regan A. Zane, Hyde Park, UT (US)

(72) Inventors: Aditya Zade, Logan, UT (US); Shubhangi Gurudiwan, Logan, UT (US); Bryce Hesterman, Providence, UT (US); Regan A. Zane, Hyde Park, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 18/979,388

(22) Filed: Dec. 12, 2024

(65) Prior Publication Data
US 2025/0274049 A1 Aug. 28, 2025

Related U.S. Application Data

(60) Provisional application No. 63/557,520, filed on Feb. 24, 2024, provisional application No. 63/557,450, filed on Feb. 23, 2024.

(51) Int. Cl.
*H02M 3/335* (2006.01)
*H02J 50/12* (2016.01)
(Continued)

(52) U.S. Cl.
CPC ......... *H02M 3/33573* (2021.05); *H02J 50/12* (2016.02); *H02M 1/0016* (2021.05); *H02M 3/01* (2021.05); *H02M 7/217* (2013.01)

(58) Field of Classification Search
CPC .. H02M 3/33573; H02M 1/0016; H02M 3/01; H02M 7/217; H02J 50/12
See application file for complete search history.

(56) References Cited

U.S. PATENT DOCUMENTS

| | | | |
|---|---|---|---|
| 11,646,671 B1 * | 5/2023 | Teeneti | H02M 7/487 323/234 |
| 2020/0295663 A1 * | 9/2020 | Yelaverthi | H02M 1/08 |

(Continued)

FOREIGN PATENT DOCUMENTS

| | | |
|---|---|---|
| CN | 107196540 A | 9/2017 |
| CN | 114069684 A | 2/2022 |
| EP | 3993256 B1 | 8/2023 |

OTHER PUBLICATIONS

Matijevic et al., "A Unified Active Damping for Grid and Converter Current Feedback in Active Front End Converters", IEEE Access, Mar. 8, 2022, pp. 30913-30924.

(Continued)

*Primary Examiner* — Lincoln D Donovan
*Assistant Examiner* — Alex W Lam
(74) *Attorney, Agent, or Firm* — Kunzler Bean & Adamson; Bruce R. Needham

(57) ABSTRACT

An apparatus includes an unfolder with three input terminals connected to a three-phase AC power source and three output terminals, p-terminal, o-terminal, and n-terminal, and a three-port converter connected to the unfolder and feeding a direct current ("DC") load. The three-port converter includes input capacitors. A feedback control loop includes outputs of a p-terminal modulation index derived from a difference between p-terminal current and a p-terminal reference current and an n-terminal modulation index derived from a difference between n-terminal current and an n-terminal reference current. A feedforward control loop outputs an emulated p-terminal current and an emulated n-terminal (Continued)

current derived from differences between DC-link voltages and ideal DC-link voltages. A duty cycle controller is configured to generate duty cycles controlling switches of the three-port converter derived from the modulation indexes and the emulated currents.

20 Claims, 25 Drawing Sheets

(51) Int. Cl.
*H02M 1/00* (2007.01)
*H02M 3/00* (2006.01)
*H02M 7/217* (2006.01)

(56) References Cited

U.S. PATENT DOCUMENTS

2021/0399629 A1* 12/2021 Everts ............... H02M 1/4283
2022/0190744 A1* 6/2022 Everts .................. H02M 1/12

OTHER PUBLICATIONS

Lee et al., "DC-Link Voltage Stabilization for Reduced DC-Link Capacitor Inverter", IEEE Transactions On Industry Applications, vol. 50, No. 1, Jun. 18, 2013, pp. 404-414.
Pham et al., "Power Factor Operation of a Boost Integrated Three-Phase Solar Inverter using Current Unfolding and Active Damping Methods", 2018 IEEE Energy Conversion Congress and Exposition (ECCE), Sep. 23-27, 2018, pp. 2896-2903.
Choi et al., "Analysis of Input Filter Interactions in Switching Power Converters", IEEE Transactions on Power Electronics, vol. 22, No. 2, Mar. 5, 2007, pp. 452-460.
Pham et al., "A Current Source Three-Phase AC-AC Converter using Current Unfolding and Active Damping Principles", 2019 IEEE Energy Conversion Congress and Exposition (ECCE), Nov. 28, 2019, pp. 6239-6245.
Dragičević et al., "DC Microgrids—Part II: A Review of Power Architectures, Applications and Standardization Issues", IEEE Transactions on Power Electronics, vol. 31, No. 5, Aug. 4, 2015, pp. 3528-3549.

* cited by examiner (a)

(b)

(c)

(a)

(b)

(c)

(d)

(a)

(b)

(a)

(b)

(c)

(d)

(a)

(b)

(c)

(d)

HIGH-BANDWIDTH CONTROL OF UNFOLDING-BASED AC-DC CONVERTERS

CROSS-REFERENCES TO RELATED APPLICATIONS

This application claims the benefit of U.S. Provisional Patent Application No. 63/557,450 entitled "HIGH-BANDWIDTH CONTROL OF UNFOLDING-BASED AC-DC CONVERTERS" filed on Feb. 23, 2024, for Aditya Zade et al., and U.S. Provisional Patent Application No. 63/557,520 entitled "HIGH-BANDWIDTH CONTROL OF UNFOLDING-BASED AC-DC CONVERTERS" and filed on Feb. 24, 2024 for Aditya Zade et al., which is incorporated herein by reference.

GOVERNMENT SUPPORT

This invention was made with government support under DE-EE0008803 awarded by the U.S. Department of Energy, and grant no. 1941524 awarded by the National Science Foundation. The government has certain rights in the invention.

FIELD

This invention relates to alternating current ("AC")-to-direct current ("DC") converters and more particularly relates to an AC-to-DC converter with an unfolder and a three-port power converter with a feed-forward controller configured to compensate for a resonance formed between grid inductances and input capacitors of the three-port converter.

BACKGROUND

The growing adoption of electric vehicles (EVs) and the essential need for grid-connected high-power charging infrastructure contribute to the continued demand for efficient grid-tied alternating current ("AC")-direct current ("DC") power converters. Renewable energy sources like photovoltaic modules, fuel cells, and battery storage units depend on AC-DC converters to ensure seamless integration with the grid. In response, grid-tied converters must adeptly and economically manage power conversion, ensuring efficiency and reliability. Given the high power drawn from the grid, maintaining sinusoidal AC currents in phase with the mains voltage is essential to ensure grid stability and quality. Conventionally, a two-stage architecture is employed, involving an active front-end (AFE) power factor correction (PFC) converter and a DC-DC converter with a high-frequency (HF) isolation transformer. The intermediate stiff DC-link in this architecture facilitates simplified system design and enables excellent dynamic control. However, the AFE in this setup often suffers from relatively high switching and reverse recovery losses, constraining its maximum operating switching frequency. This limitation necessitates a larger filter size, contributing to elevated system costs. Furthermore, employing two successive full-power processing stages leads to a decrease in the overall efficiency of the system.

To overcome these challenges, there has been a growing interest in the use of single-stage AC-DC converters in recent years. Among these, unfolding-based AC-DC converters, have gained significant attention for grid-tied applications, as they allow for the concurrent execution of PFC and output power regulation with efficient AC-DC power delivery. However, resonance between grid inductances and converter capacitors can cause instability of the AC-DC converters, which detrimentally affects closed loop control.

SUMMARY

An apparatus for high-bandwidth control of unfolding-based AC-DC converters includes an unfolder with three input terminals that connect to a three-phase alternating current ("AC") power source and three output terminals that include a p-terminal, an n-terminal and an o-terminal. The apparatus includes a three-port converter connected to the three output terminals of the unfolder. The three-port converter is configured to feed power to a direct current ("DC") load connected to converter output terminals of the three-port converter. The three-port converter includes input capacitors across three three-port converter input terminals. The apparatus includes a feedback control loop with outputs of a p-terminal modulation index $m_p$ derived from a difference between a p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$. The apparatus includes a feedforward control loop with outputs of an emulated p-terminal current $i_{p\text{-}emu}$ derived from a difference between a p-terminal DC-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage $v_{on}$ measured across the o-terminal and the n-terminal and an ideal n-terminal DC-link voltage $v_{on\text{-}ideal}$. The apparatus includes a duty cycle controller configured to generate duty cycles controlling the switches of the three-port converter. The duty cycles are derived from the p-terminal modulation index $m_p$, the emulated p-terminal current $i_{p\text{-}emu}$, the n-terminal modulation index $m_n$, and the emulated n-terminal current $i_{n\text{-}emu}$.

A power converter for high-bandwidth control of unfolding-based AC-DC converters includes an unfolder that includes an input connection comprising three input terminals that connect to a three-phase AC power source and that includes an output connection with three output terminals with a p-terminal, an n-terminal and an o-terminal. The power converter includes a three-port converter connected to the three output terminals of the unfolder. The three-port converter is configured to feed power to a direct current ("DC") load connected to converter output terminals of the three-port converter. The three-port converter includes input capacitors across three three-port converter input terminals and switches that strategically operate to feed DC power to the DC load. The three-port converter includes a switching section, a resonant tank section, and a rectification section. The resonant tank section includes one or more resonant tank inductors and one or more resonant tank capacitors and the rectification section includes the converter output terminals and the rectification section is configured to rectify a waveform present at an output of the resonant tank section.

The power converter includes a feedback control loop with outputs of a p-terminal modulation index $m_p$ derived from a difference between p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$. The power converter includes a feedforward control loop that includes outputs of an emulated p-terminal current $i_{p\text{-}emu}$ derived from a difference between a p-terminal direct current ("DC")-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage $v_{on}$ measured across the o-terminal and the n-terminal and an ideal n-terminal DC-link voltage $v_{on\text{-}ideal}$. The power converter includes a duty cycle controller configured to generate a p-terminal duty cycle $d_p$ controlling a first portion of switches of the three-port converter. The p-terminal duty cycle $d_p$ is derived from the p-terminal modulation index $m_p$ and the emulated p-terminal current $i_{p\text{-}emu}$. The duty cycle controller is configured to generate an n-terminal duty cycle $d_n$ controlling a second portion of switches of the three-port converter. The n-terminal duty cycle $d_n$ is derived from the n-terminal modulation index $m_n$ and the emulated n-terminal current $i_{n\text{-}emu}$.

An apparatus for high-bandwidth control of unfolding-based AC-DC converters includes an unfolder that includes an input connection with three input terminals that connect to a three-phase AC power source and with an output connection with three unfolder output terminals that include a p-terminal, an n-terminal and an o-terminal. The apparatus includes a three-port converter connected to the three output terminals of the unfolder. The three-port converter is configured to feed power to a direct current ("DC") load connected to converter output terminals of the three-port converter. The three-port converter includes input capacitors across three three-port converter input terminals. The apparatus includes a feedback control loop that includes outputs of a p-terminal modulation index $m_p$ derived from a difference between a p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$. The apparatus includes a feedforward control loop that includes outputs of an emulated p-terminal current $i_{p\text{-}emu}$ derived from a difference between a p-terminal DC-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between a n-terminal DC-link voltage $v_{on}$ measured across the o-terminal and the n-terminal and an ideal n-terminal DC-link voltage $v_{on\text{-}ideal}$.

The apparatus includes a duty cycle controller configured to generate a p-terminal duty cycle $d_p$ controlling a first portion of switches of the three-port converter. The p-terminal duty cycle $d_p$ is derived from the p-terminal modulation index $m_p$ and the emulated p-terminal current $i_{p\text{-}emu}$. The duty cycle controller is configured to generate an n-terminal duty cycle $d_n$ controlling a second portion of switches of the three-port converter. The n-terminal duty cycle $d_n$ is derived from the n-terminal modulation index $m_n$ and the emulated n-terminal current $i_{n\text{-}emu}$. The feedforward control loop is configured to emulate damping resistors configured to damp a resonance formed between grid inductances and the input capacitors. The ideal p-terminal DC-link voltage $v_{po\text{-}ideal}$ and the ideal n-terminal DC-link voltage $v_{on\text{-}ideal}$ include two ideal unipolar piece-wise sinusoidal DC voltage waveforms offset from each other by a half of a period. The p-terminal reference current $i_{p\text{-}ref}$ includes a scaled representation of and the n-terminal reference current $i_{n\text{-}ref}$ includes a scaled representation of an idealized p-terminal current $i_p$ and an idealized n-terminal current $i_n$ without oscillations caused by the resonance between the grid inductances from the three-phase AC power source and the input capacitors.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
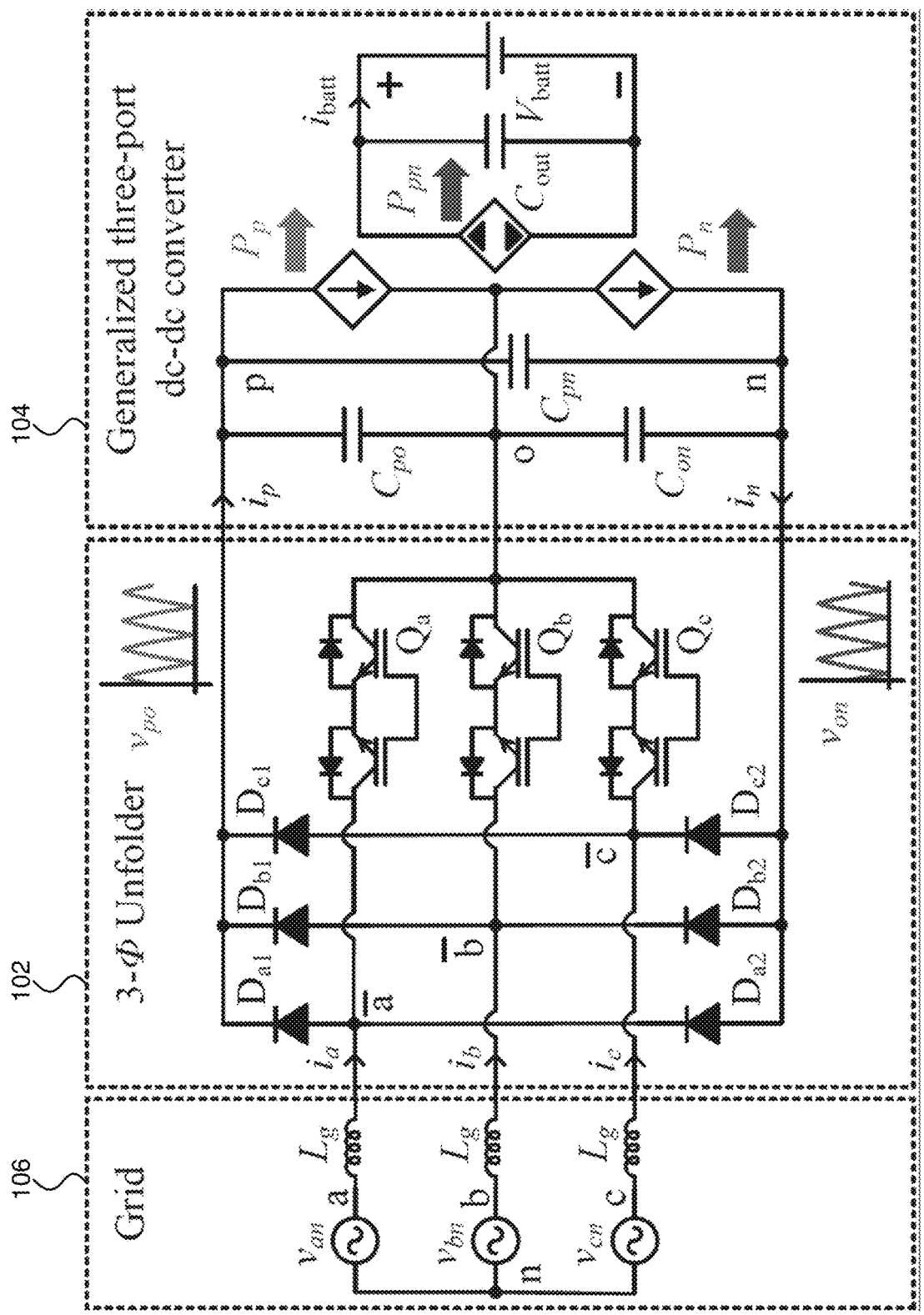
FIG. 1 is a schematic block diagram illustrating one embodiment of a grid-tied three-phase unfolder with a generalized 3-port DC-DC converter, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. Some of the voltages and currents described herein are control voltages and currents and are scaled representations of voltages and currents of converter elements.

An apparatus for high-bandwidth control of unfolding-based AC-DC converters includes an unfolder with three input terminals that connect to a three-phase alternating current ("AC") power source with grid inductances and three unfolder output terminals that include a p-terminal, an n-terminal and an o-terminal. The apparatus includes a three-port converter connected to the three output terminals of the unfolder. The three-port converter is configured to feed power to a direct current ("DC") load connected to converter output terminals of the three-port converter. The three-port converter includes input capacitors across three three-port converter input terminals. The apparatus includes a feedback control loop comprising outputs of a p-terminal modulation index $m_p$ derived from a difference between a p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$. The apparatus includes a feedforward control loop with outputs of an emulated p-terminal current $i_{p\text{-}emu}$ derived from a difference between a p-terminal DC-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage $v_{on}$ measured across the o-terminal and the n-terminal and an ideal n-terminal DC-link voltage $v_{on\text{-}ideal}$. The apparatus includes a duty cycle controller configured to generate duty cycles controlling the switches of the three-port converter. The duty cycles are derived from the p-terminal modulation index $m_p$, the emulated p-terminal current $i_{p\text{-}emu}$, the n-terminal modulation index $m_n$, and the emulated n-terminal current $i_{n\text{-}emu}$.

In some embodiments, wherein the feedforward control loop is configured to emulate damping resistors configured to damp a resonance formed between grid inductances and the input capacitors. In other embodiments, the feedforward control loop is configured to maintain a positive control phase margin and a stable feedback control loop at bandwidth values lower than the resonant frequency of grid inductances and the input capacitors of the three-port converter. In other embodiments, the feedforward control loop is configured to maintain a positive control phase margin and a stable feedback control loop at bandwidth values higher than the resonant frequency.

In some embodiments, the ideal p-terminal DC-link voltage $v_{po\text{-}ideal}$ and the ideal n-terminal DC-link voltage $v_{on\text{-}ideal}$ include two ideal unipolar piece-wise sinusoidal DC voltage waveforms offset from each other by a half of a period. In other embodiments, the unfolder converts bipolar AC voltages into two unipolar piece-wise sinusoidal DC voltage waveforms offset from each other by a half of a period, which are present at the three output terminals of the unfolder. The two unipolar piece-wise sinusoidal DC voltage waveforms are affected by oscillating voltages and currents caused due to a resonance associated with the grid inductances and input capacitors. In other embodiments, the two ideal unipolar piece-wise sinusoidal DC voltage waveforms offset from each other by a half of a period include a scaled representation of an idealized positive portion of each of three line-voltages of the three-phase AC power source realized across the p-terminal and the o-terminal and across the o-terminal and the n-terminal without oscillations caused by a resonance between grid inductances from the three-phase AC power source and the input capacitors.

In some embodiments, the p-terminal reference current $i_{p\text{-}ref}$ and the n-terminal reference current $i_{n\text{-}ref}$ include a scaled representation of an idealized p-terminal current $i_p$ and an idealized n-terminal current $i_n$ without oscillations caused by a resonance between the grid inductances from the three-phase AC power source and capacitance of the input capacitors. In other embodiments, the duty cycles comprise a p-terminal duty cycle $d_p$ and an n-terminal duty cycle $d_n$ where:

$$d_p = \frac{2}{\pi}\sin^{-1}\left(m_p\left(\sin(f_p(\theta_{grid})) - \frac{i_{p\text{-}emu}}{I_{gm}}\right)\right); \text{ and}$$

$$d_n = \frac{2}{\pi}\sin^{-1}\left(m_n\left(\sin(f_n(\theta_{grid})) - \frac{i_{n\text{-}emu}}{I_{gm}}\right)\right),$$

where:
$\theta_{grid}$ is a current position in a period of a phase of the three-phase AC power source;
$I_{gm}$ is a peak grid current;
$m_p = G_{PI}(i_{p\text{-}ref} - i_p)$;

$m_n = G_{PI}(i_{n-ref} - i_n)$, where $G_{PI}$ includes compensation from a proportional-integral ("PI") compensation;

$i_{p-emu} = k_{emu}(v_{po-ideal} - v_{po})$;

$i_{n-emu} = k_{emu}(v_{on-ideal} - v_{on})$;

$k_{emu}$ is a proportionality constant; and $f_p$ and $f_n$ are functions according to:

| Sector | $\theta_{grid}$ grid angle | $f_p$ | $f_n$ |
| --- | --- | --- | --- |
| I | $0 \leq \theta_{grid} < \pi/3$ | $\theta_{grid} + \pi/2$ | $\theta_{grid} + \pi/6$ |
| II | $\pi/3 \leq \theta_{grid} < 2\pi/3$ | $\theta_{grid} - \pi/6$ | $\theta_{grid} + \pi/6$ |
| III | $2\pi/3 \leq \theta_{grid} < \pi$ | $\theta_{grid} - \pi/6$ | $\theta_{grid} - \pi/2$ |
| IV | $\pi \leq \theta_{grid} < 4\pi/3$ | $\theta_{grid} - 5\pi/6$ | $\theta_{grid} - \pi/2$ |
| V | $4\pi/3 \leq \theta_{grid} < 5\pi/3$ | $\theta_{grid} - 5\pi/6$ | $\theta_{grid} - 7\pi/6$ |
| VI | $5\pi/3 \leq \theta_{grid} < 2\pi$ | $\theta_{grid} + \pi/2$ | $\theta_{grid} - 7\pi/6$ |

In some embodiments, the three-port converter includes a switching section, a resonant tank section, and a rectification section. The resonant tank section includes one or more resonant tank inductors and one or more resonant tank capacitors and the rectification section with output terminals configured to connect to a load and the rectification section configured to rectify a waveform present at an output of the resonant tank section. In other embodiments, the resonant tank section includes a transformer. In other embodiments, the resonant tank section includes a primary coil and a secondary coil separated from the primary coil by an air gap and wherein the primary coil and the secondary coil are configured for wireless power transfer. In some embodiments, the duty cycle controller further generates the duty cycles using a current position $\theta_{grid}$ in a period of a phase of the three-phase power source.

A power converter for high-bandwidth control of unfolding-based AC-DC converters includes an unfolder that includes an input connection comprising three input terminals that connect to a three-phase AC power source with grid inductances and that includes an output connection with three unfolder output terminals with a p-terminal, an n-terminal and an o-terminal. The power converter includes a three-port converter connected to the three output terminals of the unfolder. The three-port converter is configured to feed power to a direct current ("DC") load connected to converter output terminals of the three-port converter. The three-port converter includes input capacitors across three three-port converter input terminals. The three-port converter includes a switching section, a resonant tank section, and a rectification section. The resonant tank section includes one or more resonant tank inductors and one or more resonant tank capacitors and the rectification section includes converter output terminals and the rectification section is configured to rectify a waveform present at an output of the resonant tank section.

The power converter includes a feedback control loop with outputs of a p-terminal modulation index $m_p$ derived from a difference between a p-terminal current $i_p$ and a p-terminal reference current $i_{p-ref}$ and an n-terminal modulation index $m_n$ derived from a difference between n-terminal current $i_n$ and an n-terminal reference current $i_{n-ref}$. The power converter includes a feedforward control loop that includes outputs of an emulated p-terminal current $i_{p-emu}$ derived from a difference between a p-terminal DC-link voltage $v_{po}$ measured across the p-terminal and the o-terminal and an ideal p-terminal DC-link voltage $v_{po-ideal}$ and an emulated n-terminal current $i_{n-emu}$ derived from a difference between an n-terminal DC-link voltage $v_{on}$ measured across the o-terminal and the n-terminal and an ideal n-terminal DC-link voltage $v_{on-ideal}$. The power converter includes a duty cycle controller configured to generate a p-terminal duty cycle $d_p$ controlling a first portion of switches of the three-port converter. The p-terminal duty cycle $d_p$ is derived from the p-terminal modulation index $m_p$ and the emulated p-terminal current $i_{p-emu}$. The duty cycle controller is configured to generate an n-terminal duty cycle $d_n$ controlling a second portion of switches of the three-port converter. The n-terminal duty cycle $d_n$ is derived from the n-terminal modulation index $m_n$ and the emulated n-terminal current $i_{n-emu}$.

In some embodiments, the three-port converter includes a T-type bridge. In other embodiments, the feedforward control loop is configured to emulate damping resistors configured to damp a resonance formed between grid inductances and the input capacitors. In other embodiments, the resonant tank section includes a transformer. In other embodiments, the resonant tank section includes a primary coil and a secondary coil separated from the primary coil by an air gap and where the primary coil and the secondary coil are configured for wireless power transfer. In other embodiments, the feedforward control loop is configured to maintain a positive control phase margin and a stable feedback control loop at bandwidth values lower than the resonant frequency of grid inductances and the input capacitors of the three-port converter. In other embodiments, the feedforward control loop is configured to maintain a positive control phase margin and a stable feedback control loop at bandwidth values higher than the resonant frequency.

An apparatus for high-bandwidth control of unfolding-based AC-DC converters includes an unfolder that includes an input connection with three input terminals that connect to a three-phase AC power source with grid inductances and with an output connection with three unfolder output terminals that include a p-terminal, an n-terminal and an o-terminal. The apparatus includes a three-port converter connected to the three output terminals of the unfolder. The three-port converter is configured to feed power to a direct current ("DC") load connected to converter output terminals of the three-port converter . . . . The three-port converter includes input capacitors across three three-port converter input terminals. The apparatus includes a feedback control loop that includes outputs of a p-terminal modulation index $m_p$ derived from a difference between a p-terminal current $i_p$ and a p-terminal reference current $i_{p-ref}$ and an n-terminal modulation index $m_n$ derived from a difference between n-terminal current $i_n$ and an n-terminal reference current $i_{n-ref}$. The apparatus includes a feedforward control loop that includes outputs of an emulated p-terminal current $i_{p-emu}$ derived from a difference between a p-terminal DC-link voltage $v_{po}$ measured across the p-terminal and the o-terminal and an ideal p-terminal DC-link voltage $v_{po-ideal}$ and an emulated n-terminal current $i_{n-emu}$ derived from a difference between an n-terminal DC-link voltage $v_{on}$ measured across the o-terminal and the n-terminal and an ideal n-terminal DC-link voltage $v_{on-ideal}$.

The apparatus includes a duty cycle controller configured to generate a p-terminal duty cycle $d_p$ controlling a first portion of switches of the three-port converter. The p-terminal duty cycle $d_p$ is derived from the p-terminal modulation index $m_p$ and the emulated p-terminal current $i_{p-emu}$. The duty cycle controller is configured to generate an n-terminal duty cycle $d_n$ controlling a second portion of switches of the three-port converter. The n-terminal duty cycle $d_n$ is derived from the n-terminal modulation index $m_n$ and the emulated n-terminal current $i_{n-emu}$. The feedforward control loop is configured to emulate damping resistors configured to damp a resonance formed between grid inductances and the input capacitors. The ideal p-terminal DC-link voltage $v_{po\text{-}ideal}$ and the ideal n-terminal DC-link voltage $v_{on\text{-}ideal}$ include two ideal unipolar piece-wise sinusoidal DC voltage waveforms offset from each other by a half of a period. The p-terminal reference current $i_{p\text{-}ref}$ and n-terminal reference current $i_{n\text{-}ref}$ include a scaled representation of an idealized p-terminal current $i_p$ and an idealized n-terminal current $i_n$ without oscillations caused by the resonance between the grid inductances from the three-phase AC power source and the input capacitors.

I. Introduction

The growing adoption of electric vehicles (EVs) and the essential need for grid-connected high-power charging infrastructure contribute to the continued demand for efficient grid-tied alternating current ("AC")-direct current ("DC") power converters. Furthermore, renewable energy sources like photovoltaic modules, fuel cells, and battery storage units depend on AC-DC converters to ensure seamless integration with the grid. In response, grid-tied converters must adeptly and economically manage power conversion, ensuring efficiency and reliability. Given the high power drawn from the grid, maintaining sinusoidal AC currents in phase with the mains voltage is essential to ensure grid stability and quality. Conventionally, a two-stage architecture is employed, involving an active front-end (AFE) power factor correction (PFC) converter and a DC-DC converter with a high-frequency (HF) isolation transformer. The intermediate stiff DC-link in this architecture facilitates simplified system design and enables excellent dynamic control. However, the AFE in this setup often suffers from relatively high switching and reverse recovery losses, constraining its maximum operating switching frequency. This limitation necessitates a larger filter size, contributing to elevated system costs. Furthermore, employing two successive full-power processing stages leads to a decrease in the overall efficiency of the system.

To overcome these challenges, there has been a growing interest in the use of single-stage AC-DC converters in recent years. Among these, unfolding-based AC-DC converters, as depicted in FIG. 1, have gained significant attention for grid-tied applications, as they allow for the concurrent execution of PFC and output power regulation with efficient AC-DC power delivery. These AC-DC systems consist of a 3-phase (3-ϕ) unfolder 102 fed from a 3-phase grid 106 and which operates to invert the negative segment of AC input voltages to the positive polarity. These pulsating positive output voltages of the unfolder 102 are then directly converted to the direct current ("DC") voltage suitable for connecting to the EV battery. As a result, the unfolding-based topology provides a single-stage solution, eliminating the need for an intermediate stiff DC-link with huge DC-link capacitors found in the two-stage topology during the conversion process. The pulsating output voltages of the unfolder 102 can be converted to an appropriate DC voltage of the battery using various HF converter topologies, such as dual active bridge, 3-level buck/boost, phase-shifted full bridge, triple active bridge, or T-type bridge. Embodiments described herein employ a T-type bridge-based topology due to its dual-input voltage processing capability, which facilitates the efficient utilization of semiconductor devices. The T-type bridge-based DC-DC converter is responsible for maintaining grid-side PFC, output power regulation, and providing galvanic isolation. Operating the unfolder 102 at a maximum of twice the grid frequency with negligible switching losses, while centralizing all control functions within the DC-DC converter, results in enhanced power density, efficiency, and design simplicity.

Figure 2:
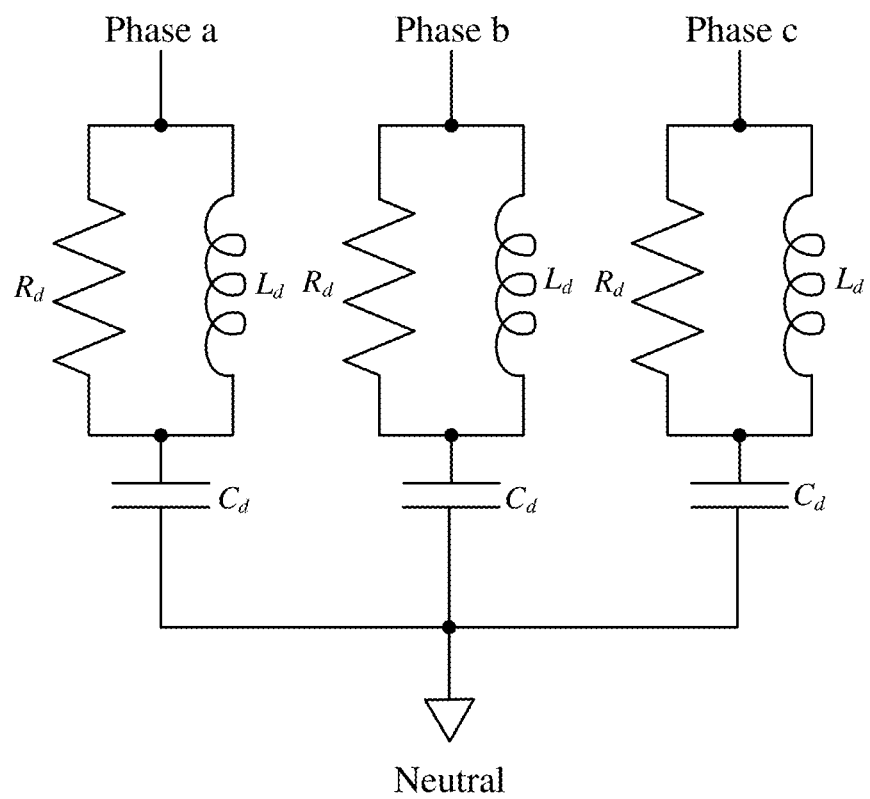
FIG. 2 is a schematic diagram illustrating a passive damping network, according to various embodiments.

However, despite their potential benefits, unfolding-based converters are prone to LC-resonance issues arising from the interaction between the grid inductances and DC-link capacitors. This resonance detrimentally affects closed-loop control by reducing the phase margin and rendering the closed-loop system unstable. While the utilization of passive physical damping networks can alleviate this control challenge, their integration results in heightened system costs and reduced power density. Also, the approach of parallel connection of physical damping resistors across input inductive filters becomes unfeasible when utilizing the inherent grid inductances for PFC, rather than incorporating additional inductive filters. Furthermore, the dimensions and costs of such passive networks experience a substantial increase with higher power levels, as exemplified in FIG. 2. FIG. 2 illustrates components that fit in a cabinet with a passive damping network comprising RLC components with dimensions that typically are sized around of 6 ft (L)×2 ft (W)×7.5 ft (H). The overall cost of this cabinet with a 3-ϕ passive damping network is around $15,000.

Given the severity of the problem, the embodiments described herein include a comprehensive examination of the unwanted LC resonance through the application of the extra element theorem (EET) as introduced by R. D. Middlebrook. EET is an effective tool for design-oriented analysis, aiding in the examination of complex circuits and systems to derive manageable equations crucial for design purposes. EET allows one to quantify the impact of the additional impedance element on any transfer function of interest, eliminating the need for re-solving the system. In the embodiments described herein, an unfolding-based topology with a T-type bridge and an LCC resonant tank is utilized. This configuration heightens the complexity of deriving the plant transfer function due to the increased number of tank elements and the variation of the pulsating input voltages of the T-type bridge. Additionally, incorporating the interaction between the grid inductances and DC-link capacitors further complicates the process of deriving the plant transfer function. The application of EET helps to derive the modified plant transfer function with the effect of this LC interaction without solving for the plant transfer function all over again. Moreover, in unfolding-based topologies, where the DC-DC converter undergoes variations in DC input voltages and corresponding duty ratios throughout the grid cycle, the extent of the LC-resonance effect on the plant transfer function changes accordingly. Consequently, it becomes imperative to assess this LC-resonance effect over the grid cycle. In this scenario, EET facilitates the identification of the worst-case operating point when the impact of the LC interaction is most pronounced, thereby minimizing the effort of performing the analysis throughout the grid cycle. Due to these benefits, the EET becomes an effective and beneficial tool for comprehending and mitigating the adverse effects of the LC resonance on the closed-loop control of unfolding-based converters. The application of the EET-based analytical framework involves deriving the plant transfer function along with the EET parameters. This is accomplished through the phasor transformation-based small signal modeling. Due to the complexity of the small-signal modeling, simplified expressions and corresponding Bode plots are additionally presented to provide readers with a valuable tool for analysis.

In addition to analyzing the issue, a control-based approach is presented, involving the utilization of the current emulation technique to actively damp the LC resonance. This is achieved by modifying the control structure of the high frequency (HF) T-type bridge-based DC-DC converter employed after the unfolder 102. This solution eliminates the requirement for physical damping circuits, thereby enhancing power density and reducing system costs. The efficacy of the proposed approach is evaluated with a 20-kW EV-battery charger circuit employing unfolding technology. Simulation results affirm the stable functioning of the overall control structure. Subsequently, a 20-kW hardware prototype is built and tested, confirming the effectiveness of the proposed control solution.

To summarize, the major contributions of the design process of embodiments described herein are:

1.) The undesirable LC resonance phenomenon common in unfolding-based AC-DC converters is extensively examined using the EET.
2.) A comprehensive small-signal modeling of the T-type bridge-based DC-DC system is conducted to derive the plant transfer function and EET parameters through phasor transformation. The results are validated through multitone analysis and hardware experimentation. Given the complexity of the modeling, simplified transfer functions are also provided for improved understanding.
3.) A control-based approach is proposed that incorporates the current emulation technique to actively damp the LC resonance and achieve high-bandwidth control. This solution eliminates the need for passive physical damping networks, thereby improving the efficiency, cost, and power density of the system.

II. Brief Overview of the Circuit Configuration and Operation of Unfolding-Based Converters FIG. 1 depicts a generalized schematic overview of unfolding-based AC-DC converters. The configuration includes the following components: ac-side grid inductances $L_g$, and unfolder 102 with a standard 3-ϕ diode bridge rectifier with a third-harmonic injection network (consisting of $Q_x$, $x \in \{a, b, c\}$), DC-link capacitors $C_{po}$, $C_{on}$, $C_{pn}$, and a three-port DC-DC converter 104. In the unfolder circuit 102, the input AC phases are linked to the positive, negative, or midpoint of the DC-link according to the switching sequence illustrated in FIG. 3(c). More precisely, the phases with the highest and lowest instantaneous voltages are linked to the positive (p) and negative (n) terminals of the DC-link (interface between the unfolder 102 and the generalized 3-port DC-DC converter 104), respectively, while the remaining phase is attached to the midpoint (o). As a result, the injection network switches, $Q_a$, $Q_b$, and $Q_c$, operate at twice the grid frequency, whereas the 3-ϕ diode bridge rectifier switches, $D_{a1}$, $D_{a2}$, $D_{b1}$, $D_{b2}$, $D_{c1}$, and $D_{c2}$, operate at the grid frequency. This switching sequence results in time-varying DC-link voltages, $v_{po}$ and $v_{on}$, depicted in FIG. 3(a), that vary from 0 to $\sqrt{3}V_{gm}/2$, where $V_{gm}$ denotes the peak value of the unfolder's line-to-line AC input voltages. The pulsating characteristic of the DC-link voltages eliminates the necessity for employing large DC-link capacitors. Instead, smaller capacitors, $C_{po}$, $C_{on}$, and $C_{pn}$, are specifically used to filter the HF switching current-ripple generated by the DC-DC conversion system. To process power from these two time varying DC-link voltages, the DC-DC conversion system can employ either two separate DC-DC converters or a single DC-DC converter capable of handling two input voltages. The DC-DC system emulates a balanced load across the DC-link, shaping grid currents sinusoidal, as shown in FIG. 3(b). Moreover, as the unfolder 102 operates at a reduced switching frequency, control tasks including grid-side PFC and output power regulation need to be handled by the DC-DC conversion system.

Figure 4:
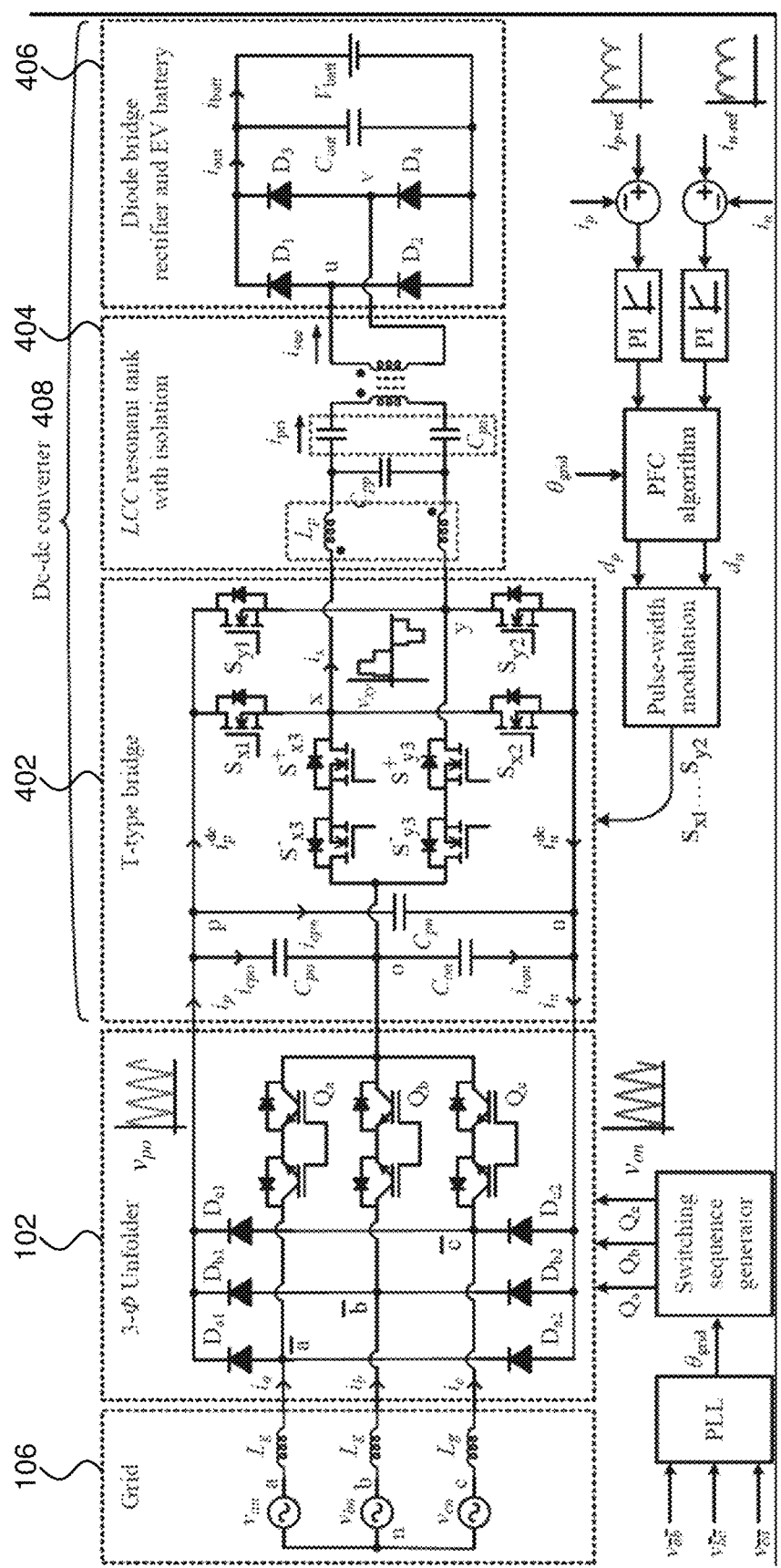
FIG. 4 is a schematic block diagram illustrating a circuit schematic and control structure of an unfolding-based AC-DC system with a T-type primary bridge-based DC-DC converter where the input currents of the T-type bridge, $i_p$ and $i_n$, are controlled to shape the grid currents sinusoidally for PFC and simultaneously achieve output power regulation, according to various embodiments.

This study employs a T-type bridge-based three-port DC-DC converter, as illustrated in FIG. 4, to process power from the unfolder 102. The T-type bridge 402 merges two H-bridges into a single T-type three-port converter 408, efficiently utilizing the semiconductor devices and allowing the use of a single transformer for isolation, which increases the power density of the system. In some embodiments, the transformer is replaced by a primary coil and a secondary coil separated from the primary coil by an air gap and the primary coil and the secondary coil are configured for wireless power transfer, for example in EVs. The T-type bridge 402 converts pulsating input DC-link voltages into an HF five-level voltage output. Its control strategy ensures sinusoidal grid currents for PFC and concurrently regulates the resonant tank voltage, $v_{xy}$, of a resonant tank 404, throughout the grid cycle for output power control. An LCC resonant tank 404 extracts the fundamental component from the T-type output voltage, $v_{xy}$. The LCC resonant tank 404 is followed by a diode bridge rectifier and EV battery 406. The HF secondary-side current, $i_{sec}$, gets rectified through a diode bridge rectifier, followed by a filter capacitor, $C_{out}$. The resulting rectified current, $i_{batt}$, is utilized to charge the battery of an EV. Other designs include other loads, such as a DC motor or other DC load.

Figure 5:
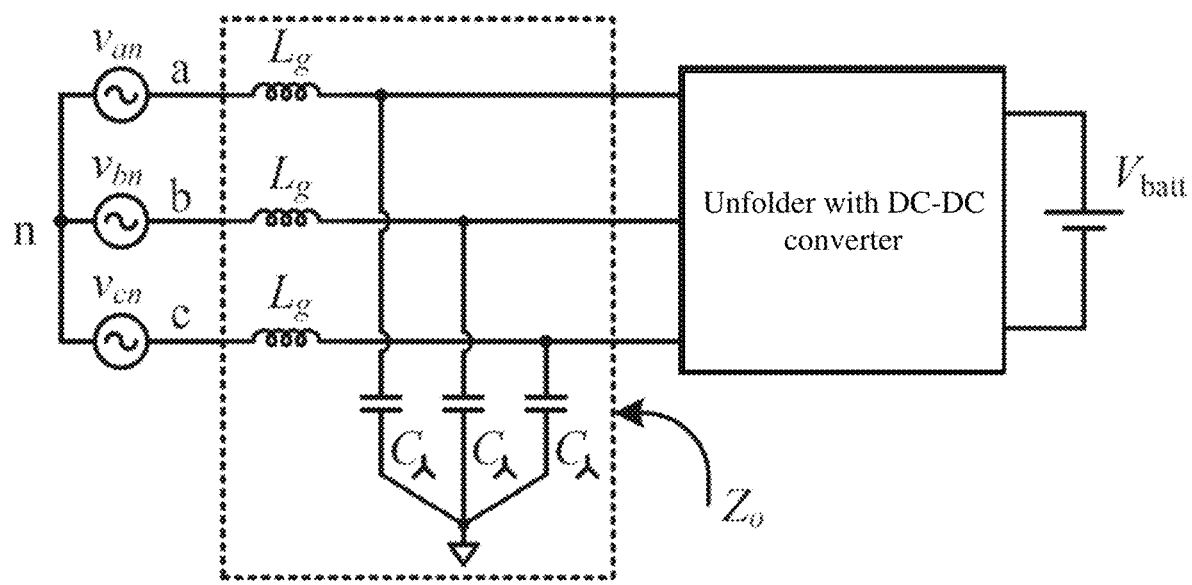
FIG. 5 is a simplified schematic block diagram illustrating that the Δ-connected DC-link capacitors can be relocated to the grid side and transformed into equivalent λ-connected capacitors and the output impedance of the LC branch, denoted as $Z_o$, is a parallel combination of $L_g$ and $C_\lambda$, according to various embodiments.

III. Effect of Lc Resonance on Closed-Loop Control and Review of Extra Element Theorem As previously explained, the unfolder switches are strategically operated at a maximum of twice the grid frequency, converting every negative segment of AC input voltages into a positive polarity. While advantageous in terms of reducing switching losses, the use of low switching frequency introduces the possibility of LC resonance between the grid inductance ($L_g$) and DC-link capacitors ($C_{po}$, $C_{on}$, and $C_{pn}$). To better understand this resonance phenomenon, a transformative approach is taken by relocating the Δ-connected DC-link capacitors to the grid side and representing them in a λ-connected configuration ($C_\lambda = 3C_{po} = 3C_{on} = 3C_{pn}$), as depicted in FIG. 5. It is crucial to highlight that the occurrence of the LC resonance and the consequent reconfiguration of DC-link capacitors to the grid side, essential for comprehending this resonance, are both made possible by the lower switching frequency of the unfolder 102. This frequency remains well below the LC resonant frequency. (In the embodiments described herein, the unfolder switches operate at a maximum of 120 hertz (Hz), while the LC resonant frequency is 1.77 kilohertz (kHz), as described in section VIII.) On the other hand, such a scenario is not possible for HF-switched grid-tied converters with stiff DC-link voltages. In these systems, the HF switching does not allow sufficient time for the grid inductances and DC-link capacitors to interact with each other, thereby effectively ensuring decoupling between the grid and DC sides.

The LC resonance causes changes in both the magnitude and phase of the plant in the closed-loop control system. These changes can be quantified using the EET as:

$$G_{plant-modified} = G_{plant-original} G_{cf}, \quad (1)$$

where:

$$G_{plant-original} = G_{plant}|_{Z_o \to 0}, \quad (2)$$

-continued $$G_{cf} = \frac{\left(1 + \frac{Z_o}{Z_n}\right)}{\left(1 + \frac{Z_o}{Z_d}\right)}. \quad (3)$$

In the above equations:

$$Z_o = sL_g \parallel \left(\frac{1}{sC_\lambda}\right) = \frac{sL_g}{1 + s^2 L_g C_\lambda}, \quad (4)$$

is the output impedance of the parallel-connected grid inductance, $L_g$, and equivalent λ-connected capacitor on the grid side, $C_\lambda$, as depicted in FIG. 5. $Z_n$ and $Z_d$ are the null double injection driving point impedance and single injection driving point impedance, respectively. Further details about these impedances are provided in Section IV.

The correction factor, $G_{cf}$, is a function of $Z_o$, $Z_n$, and $Z_d$. It quantifies the extent to which the original plant transfer function, $G_{plant-original}$, is modified to $G_{plant-modified}$ due to the interaction of the output impedance, $Z_o$, with the null double injection driving point and single injection driving point impedances, $Z_n$ and $Z_d$. Normally, when the resonance is undamped, the magnitude of $Z_o$, denoted as $\|Z_o\|$, exceeds $\|Z_n\|$ or $\|Z_d\|$ around the LC resonant frequency, $f_{LC}$, leading to a deviation of $G_{cf}$ from unity. This leads to unfavorable alterations in the original plant transfer function, extensively discussed in Section V, causing instability in the closed-loop system due to a decrease in the phase margin. Equations (1)-(3) suggest that to maintain the plant transfer function unaffected by ensuring $G_{cf} \approx 1$, the magnitude of $Z_o$ must be kept much lower than the magnitudes of $Z_n$, and $Z_d$. These criteria are given below:

$$\|Z_o\| \ll \|Z_n\|, \text{ and} \quad (5)$$

$$\|Z_o\| \ll \|Z_d\|.$$

IV. Plant Transfer Function and Eet Parameters of the T-Type Bridge-Based Dc-Dc Converter A. Notation For the embodiments described herein, small-signal quantities are denoted using lowercase letters with a hat notation (^), while steady state quantities are indicated using capital letters. Quantities specified with only lowercase letters, without a hat, represent full signal quantities, which include both steady-state and small-signal components. Phasors, on the other hand, are represented using an arrow notation (→). Finally, as previously used to denote, double bars ($\| \; \|$) signify the magnitude of a quantity.

B. Computation of the Plant Transfer Function

As the unfolder 102 operates in open-loop mode, switching at a maximum of twice the grid frequency, the closed-loop control architecture is designed solely for the HF T-type bridge-based DC-DC converter 408 to modulate the duty ratios, $d_p$ and $d_n$, as demonstrated in FIG. 4. Consequently, this study analyzes the effect of LC resonance on this closed-loop system, which is designed for achieving grid-side PFC and output power regulation. These control objectives are achieved by maintaining waveshapes and amplitudes of the input p-terminal and n-terminal currents ($i_p$ and $i_n$) of the T-type bridge 402. By separately controlling $i_p$ and $i_n$, the grid currents, which are piece-wise functions of these p-terminal and n-terminal currents (refer to FIG. 3(b)), are kept sinusoidal. Furthermore, maintaining the required amplitudes of $i_p$ and $i_n$ ensures the proper regulation of the output power. Due to the symmetry between p-terminal and n-terminal controls, the analysis ahead mainly focuses on the p-terminal control. However, a similar analysis is applicable to the n-terminal control as well. In this closed-loop control architecture, a plant transfer function of the p-terminal ($G_{plant-p-terminal}$) is calculated between the small-signal p-terminal current ($\hat{i}_p$) and the small signal p-terminal duty ratio ($\hat{d}_p$), given as $$G_{plant-p-termini} = \frac{\hat{i}_p}{\hat{d}_p}. \quad (6)$$

The implementation of an LCC resonant tank with a suitable quality factor facilitates the achievement of sinusoidal current or voltage waveforms on both the primary and secondary sides of the DC-DC conversion system. In this context, employing a small-signal modeling approach based on phasor transformation is considered suitable. The modeling procedure for calculating $G_{plant-p-terminal}$ involves mainly three steps:

1.) Steady-state analysis to derive the relationship between steady-state p-terminal current, $I_p$, and corresponding steady-state p-terminal duty ratio, $D_p$, given as $$I_p = \frac{2}{\pi} I_{xm} \cos\left(\frac{\pi}{2}(1 - D_p) + \Theta_x\right) \sin\left(\frac{\pi D_p}{2}\right). \quad (7)$$

Figure 6:
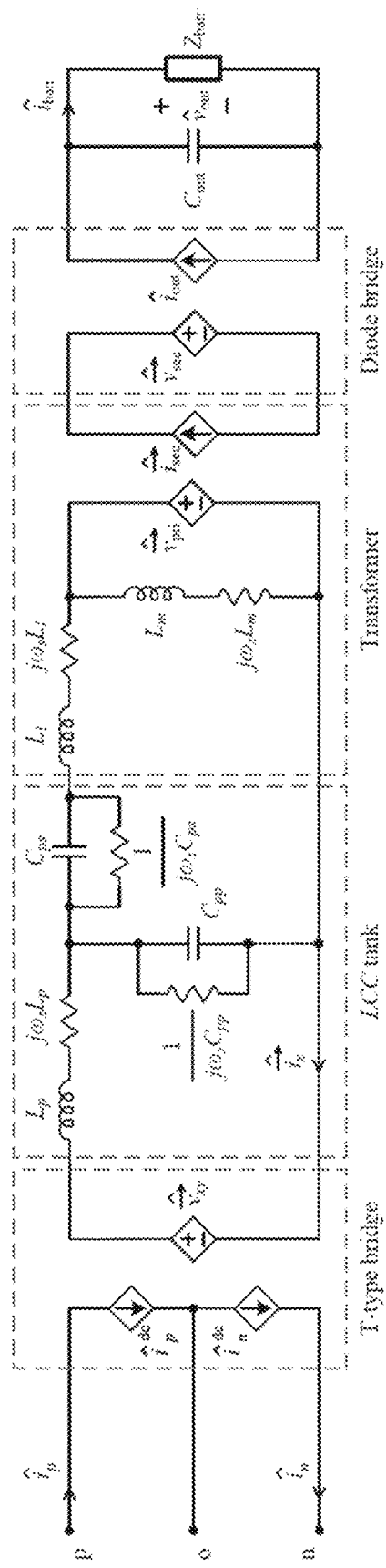
FIG. 6 is a schematic block diagram illustrating a small-signal circuit in phasor-transformed representation for the T-type bridge-based DC-DC conversion system, incorporating an LCC resonant tank with a cantilever-modeled transformer, secondary diode bridge rectifier, and output capacitive filter where an output battery is represented with its impedance in the small-signal domain, according to various embodiments.

2.) Derivation of a small-signal phasor-transformed circuit for the T-type bridge 402, LCC resonant network with a transformer, along with the diode bridge on the secondary side, as shown in FIG. 6.

3.) Calculation of the plant transfer function using the phasor-transformed small-signal circuit, given as $$G_{plant-p-terminal} = \frac{\hat{i}_{p^x-env}^i}{\hat{i}_{x-env}^{d_p}} \frac{\hat{i}_{x-env}^{d_p}}{\hat{d}_p} + \frac{\hat{i}_p^{\theta_x}}{\hat{\theta}_x^{d_p}} \frac{\hat{\theta}_x^{d_p}}{\hat{d}_p} + \frac{\hat{i}_p^{d_p}}{\hat{d}_p}, \quad (8)$$

where:

$$\frac{\hat{i}_{p^x-env}^i}{\hat{i}_{x-env}^{d_P}} = \frac{2}{\pi} \cos\left(\frac{\pi}{2}(1 - D_P) + \Theta_x\right) \sin\left(\frac{\pi D_P}{2}\right), \quad (9)$$

$$\frac{\hat{i}_p^{\theta_x}}{\hat{\theta}_x^{d_P}} = -\frac{2}{\pi} I_{xm} \sin\left(\frac{\pi}{2}(1 - D_P) + \Theta_x\right) \sin\left(\frac{\pi D_P}{2}\right), \quad (10)$$

$$\frac{\hat{i}_p^{d_p}}{\hat{d}_p} = I_{xm} \sin(\pi D_p - \Theta_x), \quad (11)$$

$$\frac{\hat{i}_{x-env}^{d_P}}{\hat{d}_p} = \frac{A_0}{B_1 s + B_0}, \quad (12)$$

$$\frac{\hat{\Theta}_x^{d_p}}{\hat{d}_p} = \frac{C_0}{D_1 s + D_0}, \quad (13)$$

Figure 7:
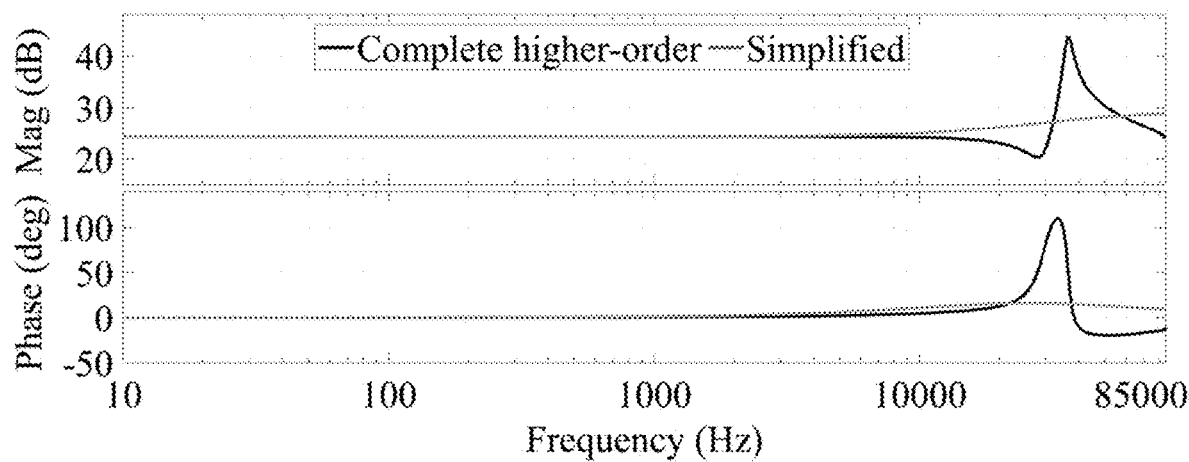
FIG. 7 is a comparison of bode plots of the plant ($G_{plant\text{-}p\text{-}terminal} = \hat{i}_p/\hat{d}_p$) of the T-type bridge-based dc-dc conversion system, obtained from the complete higher-order and simplified phasor transformation-based small-signal modeling where it can be observed that the simplified modeling closely preserves the magnitude and phase of the plant transfer function up to 10 kHz, according to various embodiments.

Due to the complexity of small-signal modeling for the T-type bridge-based DC-DC system 408 with an LCC tank, the embodiments described herein provide only first-order simplified expressions for $\hat{i}_{x-env}^{d_p}/\hat{d}_p$ and $\hat{\Theta}_x^{d_p}/\hat{d}_p$ to maintain brevity; these quantities, in fact, represent tenth-order behavior. It should be noted that these simplifications still accurately preserve the magnitude and phase of the plant transfer function, $G_{plant-p-terminal}$, with precision in the vicinity of the LC resonant frequency, as depicted in FIG. 7, providing readers with a valuable tool for analysis. The expressions for $A_0$, $B_0$, $B_1$, $C_0$, $D_0$, and $D_1$ are provided in Appendix A.

In equations (7)-(13) and (37)-(42), $D_p$, $\Theta_x$, $I_{xm}$, $I_{xr}$, $I_{xi}$, $V_{po}$, $\Theta_{sec}$, $I_{sec-m}$, $I_{sec-r}$, $I_{sec-i}$, and $V_{sec-m}$ are the steady-state quantities of the T-type bridge-based DC-DC conversion system 408 calculated at a specific grid angle where the plant transfer function, $G_{plant-p-terminal}$, is being derived. $\Theta_x$ represents the amount of phase lag of the T-type bridge output current. $I_{xm}$, $I_{xr}$, and $I_{xi}$ correspond to the magnitude, real, and imaginary components of the T-type bridge output current phasor ($\vec{i_x}$), respectively. $\theta_{sec}$ denotes the amount of phase lag of the secondary-side current flowing into the diode bridge. $I_{sec-m}$, $I_{sec-r}$, and $I_{sec-i}$ refer to the magnitude, real, and imaginary components of the secondary-side current phasor ($\vec{i_{sec}}$), respectively. $V_{sec-m}$, $V_{sec-r}$, and $V_{sec-i}$ are the magnitude, real, and imaginary components of the secondary-side voltage phasor ($\vec{v_{sec}}$), respectively.

Moreover, $\hat{i}_p^{i_{x-env}}$ and $\hat{i}_p^{\theta_x}$ are perturbations in the p-terminal current, $i_p$, of the T-type bridge 402 that depend upon small-signal changes in the envelope ($\hat{i}_{x-env}^{d_p}$) and phase ($\hat{\theta}_x^{d_p}$) of the T-type bridge output tank current phasor ($\vec{i_x}$), respectively. These perturbations occur due to small-signal deviations introduced in the p-terminal duty ratio, $d_p$. Furthermore, $\hat{i}_p^{d_p}$ represents the direct effect of the small-signal change in $d_p$ on p-terminal current, $i_p$. The p-terminal plant transfer function, $G_{plant-p-terminal}$, is calculated by combining all these perturbations together, as given by equation (8).

Figure 8:
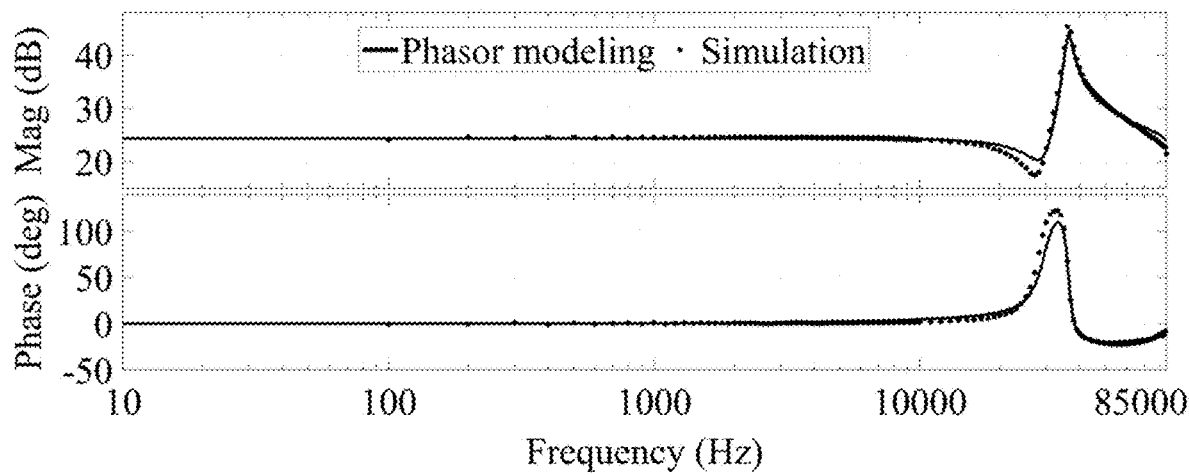
FIG. 8 is a comparison of bode plots of the plant ($G_{plant\text{-}p\text{-}terminal} = \hat{i}p/\hat{d}_p$) of the T-type bridge-based DC-DC conversion system, obtained from the complete higher-order phasor transformation-based small-signal modeling and PLECS® multitone analysis-tool-based simulation; according to various embodiments.

For a thorough examination, a complete higher-order plant transfer function without any simplifications is considered in subsequent sections for analyzing the effect of the LC resonance phenomenon. The Bode plots of $G_{plant-p-terminal}$ derived from the complete higher-order phasor transformation-based modeling are validated by comparison with Bode plots obtained using the multitone analysis (PLECS® simulation tool), as illustrated in FIG. 8.

C. Computation of $Z_n$

Figure 9:
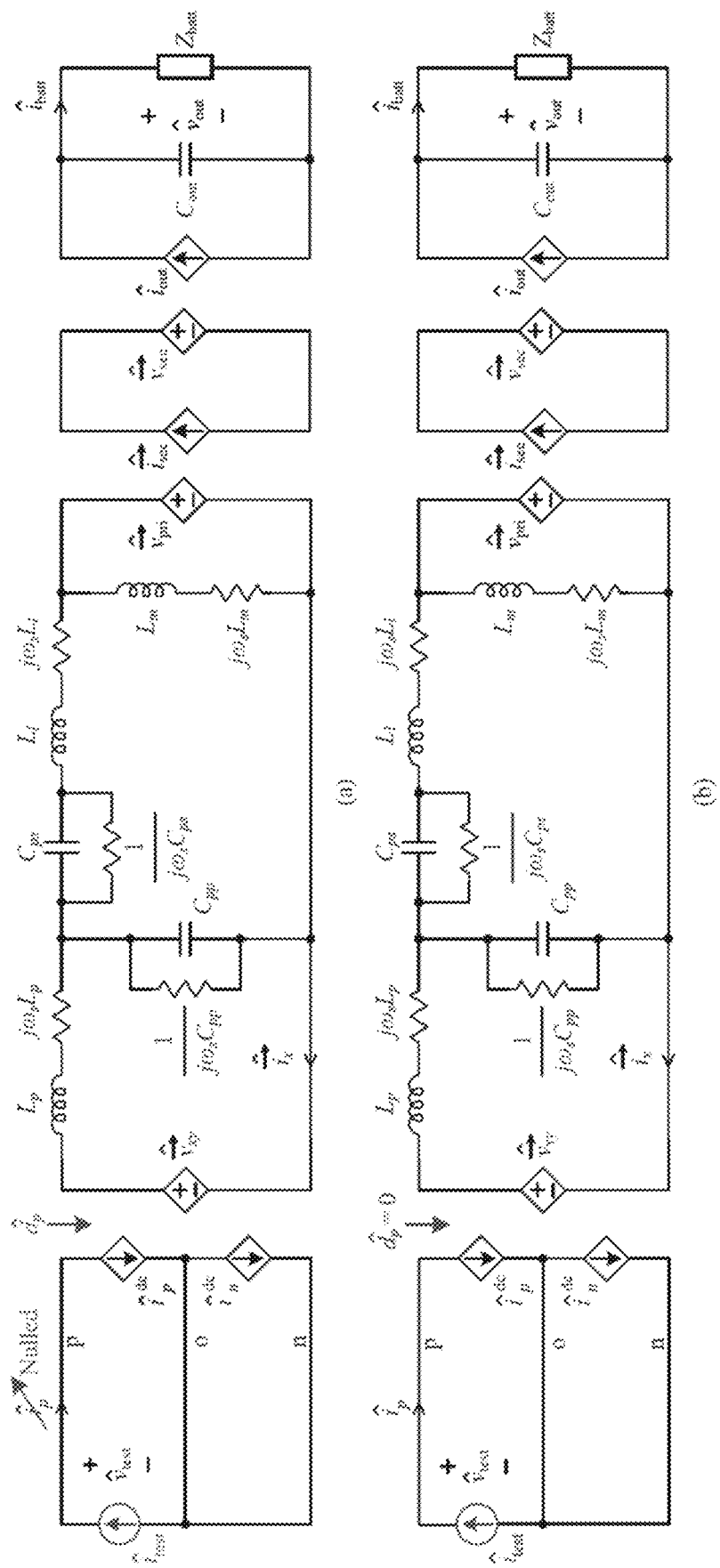
FIG. 9 is a schematic block diagram illustrating phasor-transformed small-signal circuits for the T-Type bridge-based DC-DC conversion system for the calculation of (a) null double injection driving point impedance $Z_{n\text{-}p\text{-}terminal}$ and (b) single injection driving point impedance $Z_{d\text{-}p\text{-}terminal}$, according to various embodiments.

FIG. 9(a) illustrates the circuit utilized to calculate null double injection driving point impedance, $Z_{n-p-terminal}$, for the p-terminal closed-loop control of the T-type bridge-based DC-DC conversion system 408. In the presence of $\hat{d}_p$, a current $\hat{i}_{test}$ is injected at the input p-terminal of the T-type bridge 402, and the $\hat{d}_p$ and $\hat{i}_{test}$ are adjusted in such a way that the output of the plant transfer function ($G_{plant-p-terminal}$), which is $\hat{i}_p$, is nulled. Under these conditions, $\hat{v}_{test}$ is computed, and $$Z_{n-p-terminal} = \frac{\hat{v}_{test}}{\hat{i}_{test}}\bigg|\hat{i}_p \xrightarrow{null} 0. \tag{14}$$

However, in this case where $\hat{i}_{test}$ equals $\hat{i}_p$, and the latter is nulled to zero, $Z_{n-p-terminal}$ remains consistently infinite, $$Z_{n-P-terminal} = \infty. \tag{15}$$

Intuitively, the null double injection driving point impedance, $Z_{n-p-terminal}$, can be understood as the impedance that would be measured at the input terminals of the T-type bridge 402 if an ideal feedback loop perfectly regulated the p-terminal current, thus making the disturbance in the current, $\hat{i}_p$, equal to zero.

D. Computation of $Z_d$

FIG. 9(b) illustrates the circuit utilized to calculate single injection driving point impedance, $Z_{d-p-terminal}$, for the p-terminal closed-loop control of the T-type bridge-based DC-DC conversion system 408. The input $\hat{d}_p$ is made equal to zero, and the current $\hat{i}_{test}$ is injected at the input p-terminal of the T-type bridge 402. The quantity $Z_{d-p-terminal}$ is then derived as $$Z_{d-p-terminal} = \frac{\hat{v}_{test}}{\hat{i}_{test}}\bigg| \hat{d}_p = 0. \tag{16}$$

Intuitively, the single injection driving point impedance, $Z_{d-p-terminal}$, can be understood as the impedance that would be measured at the input terminals of the T-type bridge 402 if the DC-DC converter is operated in open-loop, thus making the disturbance in the duty, $\hat{d}_p$, equal to zero.

The three-step procedure for the phasor transformation based small-signal modeling discussed earlier is employed to calculate $Z_{d-p-terminal}$, as given by $$Z_{d-p-terminal} = \frac{1}{\frac{\hat{i}_{test}^{i_{x-env}}}{\hat{i}_{test}^{v_{test}}}\frac{\hat{i}_{x-env}^{v_{test}}}{\hat{v}_{test}} + \frac{\hat{i}_{test}^{\theta_x}}{\hat{\theta}_x^{v_{test}}}\frac{\hat{\theta}_x^{v_{test}}}{\hat{v}_{test}}}, \tag{17}$$

where $$\frac{\hat{i}_{test}^{i_{x-env}}}{\hat{i}_{x-env}^{v_{test}}} = \frac{2}{\pi}\cos\left(\frac{\pi}{2}(1-D_p)+\Theta_x\right)\sin\left(\frac{\pi D_p}{2}\right), \tag{18}$$

$$\frac{\hat{i}_{test}^{\theta_x}}{\hat{\theta}_x^{v_{test}}} = -\frac{2}{\pi}I_{xm}\sin\left(\frac{\pi}{2}(1-D_p)+\Theta_x\right)\sin\left(\frac{\pi D_p}{2}\right), \tag{19}$$

$$\frac{\hat{i}_{x-env}^{v_{test}}}{\hat{v}_{test}} = \frac{E_0}{F_0}, \tag{20}$$

$$\frac{\hat{\theta}_x^{v_{test}}}{\hat{v}_{test}} = \frac{G_0}{H_0}. \tag{21}$$

Figure 10:
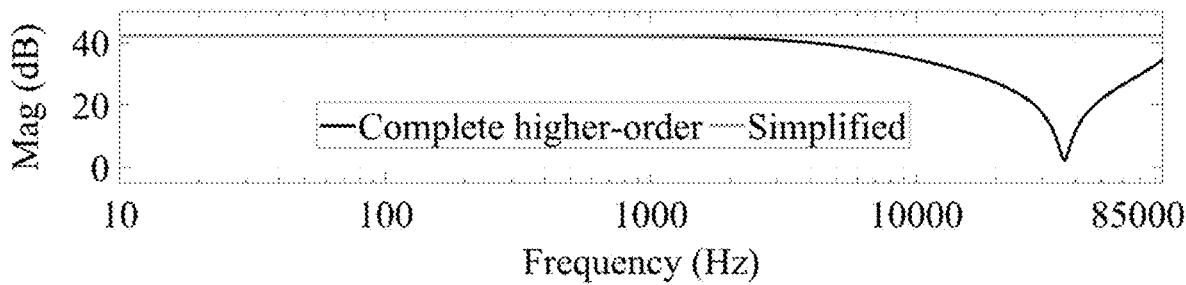
FIG. 10 is a comparison of the magnitude Bode plots of $Z_{d\text{-}p\text{-}terminal}$ at a grid angle of $\theta_{grid} = \pi/15$ obtained from the complete higher-order and simplified phasor transformation-based modeling, according to various embodiments.

Similar to the procedure for calculating the plant transfer function, deriving $Z_{d-p-terminal}$ using phasor transformation-based modeling for the T-type bridge-based DC-DC conversion system 408 involves complexities. Therefore, simplified expressions for $\hat{i}_{x-env}^{v_{test}}/\hat{v}_{test}$ and $\hat{\theta}_x^{v_{test}}/\hat{v}_{test}$ are provided to maintain brevity. It is important to note that these simplifications approximately preserve the magnitude of $Z_{d-p-terminal}$ around the LC resonant frequency, as depicted in FIG. 10, offering a valuable tool for analyzing the criteria given in equation (5). FIG. 10 depicts that the simplified modeling closely preserves the magnitude of the single injection driving point impedance at lower frequencies, where the LC resonant frequency typically resides. Therefore, the simplified phasor transformation-based modeling provides a valuable tool for analyzing the criteria given in equation (5). The expressions for $E_0$, $F_0$, $G_0$, and $H_0$ are provided in Appendix A.

In equations (17)-(21), $\hat{i}_{test}^{i_{x\text{-}env}}$ and $\hat{i}_{test}^{\theta_x}$ are perturbations in the p-terminal injected test current ($i_{test}$) of the T-type bridge 402 that depend upon small-signal changes in the envelope ($\hat{i}_{x\text{-}env}^{v_{test}}$) and phase ($\hat{\theta}_x^{v_{test}}$) of the T-type bridge output tank current phasor ($\vec{i_x}$), respectively. These perturbations occur due to small-signal deviations in $v_{test}$. The p-terminal single injection driving point impedance, $Z_{d\text{-}p\text{-}terminal}$, is calculated by combining all these perturbations together, as given by equation (17).

Figure 11:
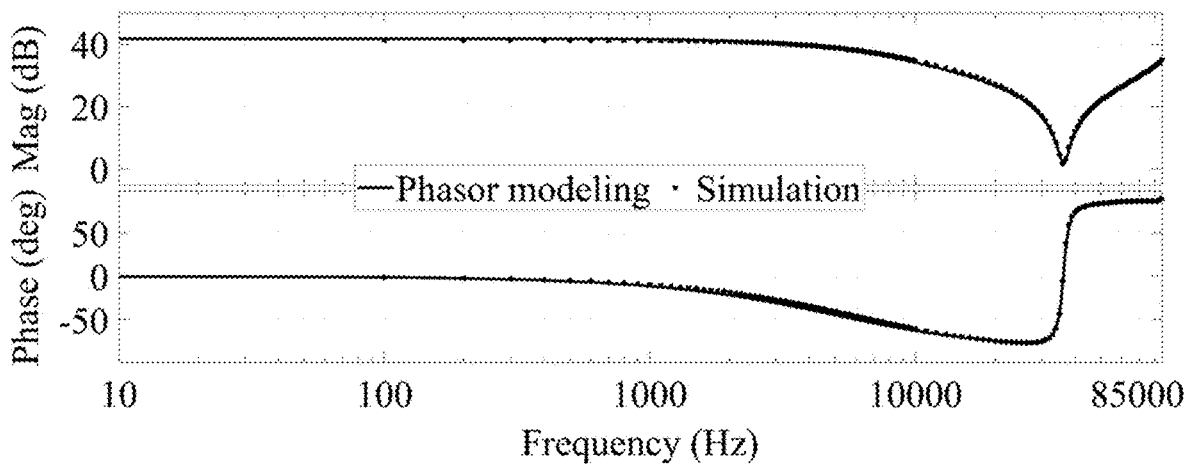
FIG. 11 is a comparison of Bode plots of the single injection driving point impedance, $Z_{d\text{-}p\text{-}terminal}$, at a grid angle of $\theta_{grid}=\pi/15$ obtained from the complete higher-order phasor transformation-based small-signal modeling and PLECS multitone analysis-tool-based simulation, according to various embodiments.
Figure 12:
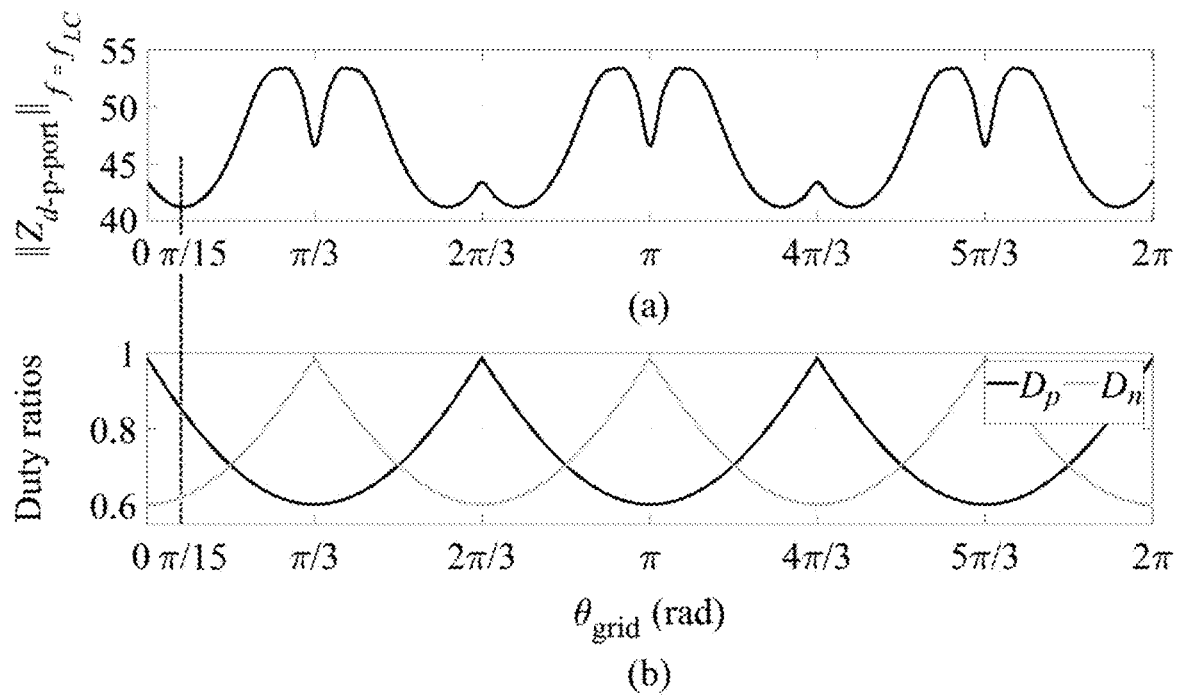
FIG. 12 depicts (a) Variation of $\|Z_{d\text{-}p\text{-}terminal}\|$ at $f=f_{LC}$ throughout the grid cycle due to (b) the variation in the steady-state duty ratios, $D_p$ and $D_n$, of the T-type bridge to maintain PFC and output power regulation, according to various embodiments.

For a thorough examination, the analysis ahead utilizes a complete higher-order $Z_{d\text{-}p\text{-}terminal}$ without any simplifications to analyze the effect of the LC resonance phenomenon. The Bode plots of $Z_{d\text{-}p\text{-}terminal}$, derived by the complete higher-order phasor transformation-based modeling, have been verified by comparing them with Bode plots given by multitone analysis (using the PLECS simulation tool), as depicted in FIG. 11, at a grid angle of $\theta_{grid}=\pi/15$. Due to the variation of steady state duty ratios of the T-type bridge 402 across the grid cycle to maintain PFC and output power regulation, as illustrated in FIG. 12(*b*), the magnitude and phase Bode plots of $Z_{d\text{-}p\text{-}terminal}$ also undergo changes throughout this grid cycle. The corresponding variation of $\|Z_{d\text{-}p\text{-}terminal}\|$ at the LC resonant frequency over the grid cycle is depicted in FIG. 12(*a*).

V. Effect of Lc Resonance on Closed-Loop Control of the T-Type Bridge-Based Dc-Dc Conversion System It can be observed from the criteria given in equation (5) that the plant transfer function gets more significantly influenced by the LC resonance when the $\|Z_n\|$ or $\|Z_d\|$ are lower. Consequently, the subsequent analysis focuses on the worst case scenario observed over the grid cycle, particularly when $\|Z_{d\text{-}p\text{-}terminal}\|_{f=f_{LC}}$ reaches its minimum value of 41.27 dB at $\theta_{grid}=(2k\pi/3\pm\pi/15)$, where $k \in \{0, 1, 2, 3, \ldots\}$, as illustrated in FIG. 12(*a*). It is crucial to reiterate that $\|Z_{n\text{-}p\text{-}terminal}\|$ maintains an infinite value throughout the grid cycle, thereby eliminating the need for further analysis, as it being infinity consistently satisfies one of the criteria outlined in equation (5).

Figure 13:
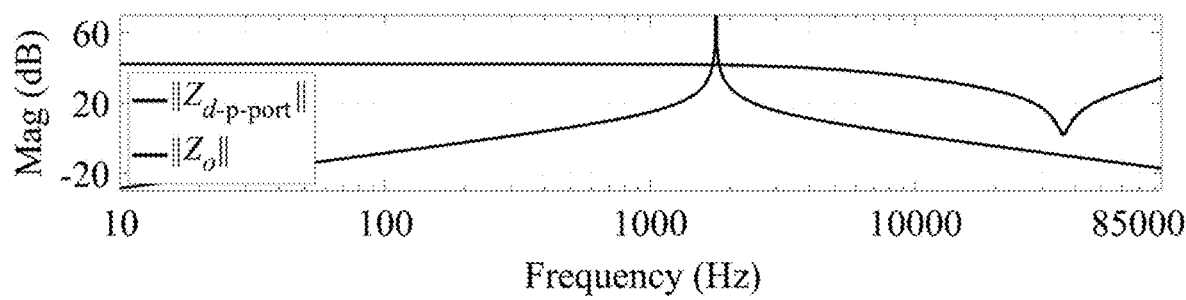
FIG. 13 depicts Bode plots that include: (a) the interaction of LC resonance with the magnitude of $Z_{d\text{-}p\text{-}terminal}$, (b) the correction factor, $G_{cf}$, showing the deviation from unity attributed to the LC resonance as given by equation (3), and (c) the original plant transfer function ($G_{plant\text{-}p\text{-}terminal\text{-}original}$) undergoing significant modifications because of the LC resonance, notably characterized by a '−360 degree' phase shift in the phase Bode plot where the modified plant transfer function is denoted as $G_{plant\text{-}p\text{-}terminal\text{-}modified}$, according to various embodiments.
Figure 13:
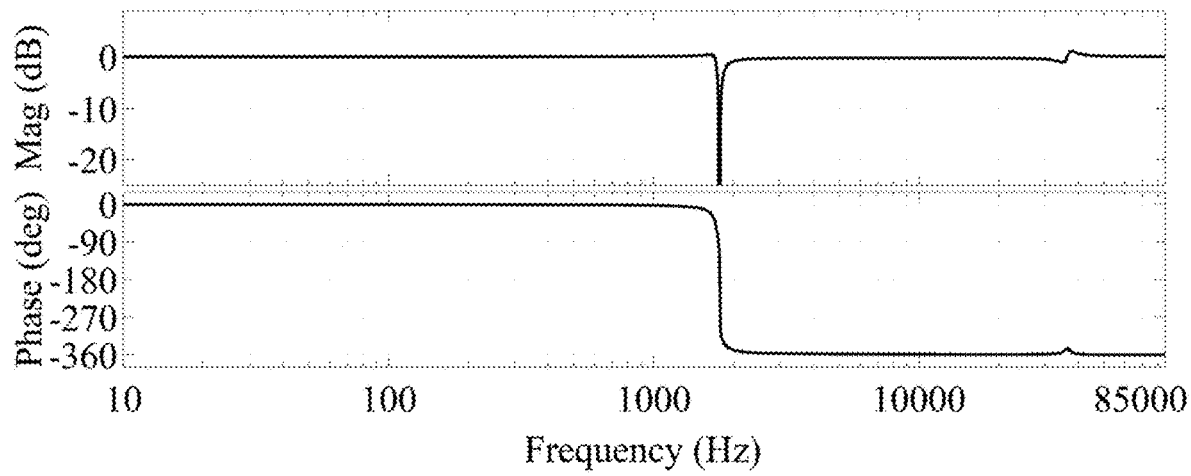
Figure 13:
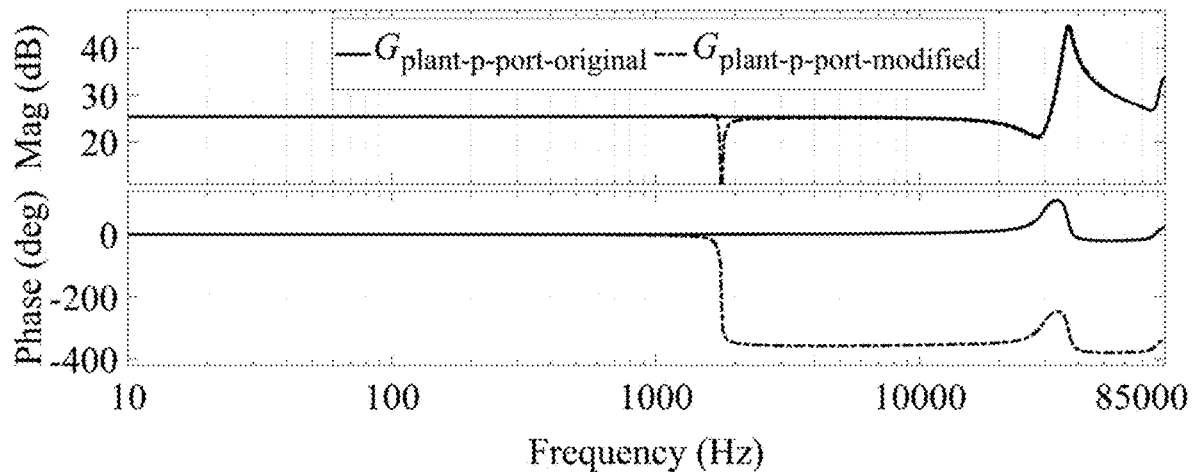

In FIG. 13(*a*), the presence of LC resonance is evident from the magnitude plot of $Z_0$, occurring at the resonant frequency of 1.77 kHz ($f_{LC}=1/(2\pi\sqrt{L_g C_\lambda})$; refer to the values of $L_g$ and $C_\lambda$ given in Section VIII). This resonance interacts with $\|Z_{d\text{-}p\text{-}terminal}\|$ and significantly impacts the correction factor, $G_{cf}$, causing it to deviate from unity, as calculated below using equation (3)

$$G_{cf} = \frac{\left(1 + \dfrac{Z_o}{Z_{n\text{-}p\text{-}terminal}}\right)}{\left(1 + \dfrac{Z_o}{Z_{d\text{-}p\text{-}terminal}}\right)} \quad (22)$$

and shown in FIG. 13(*b*). The deviation in $G_{cf}$ from unity results in modifications to both the magnitude and phase Bode plots of the original plant transfer function, denoted as $G_{plant\text{-}p\text{-}terminal\text{-}original}$ in this section and given in equation (8). These modifications are calculated using equation (1) as given below $$G_{plant\text{-}p\text{-}terminal\text{-}modified} = G_{plant\text{-}p\text{-}terminal\text{-}original} G_{cf} \quad (23)$$

and are depicted in FIG. 13(*c*). It is observable that the modified plant transfer function, $G_{plant\text{-}p\text{-}terminal\text{-}modified}$, has experienced significant changes as a consequence of the resonance between the grid inductances and DC-link capacitors, leading to an additional '−360 phase (°)' phase shift in the phase Bode plot at the resonant frequency.

Figure 3:
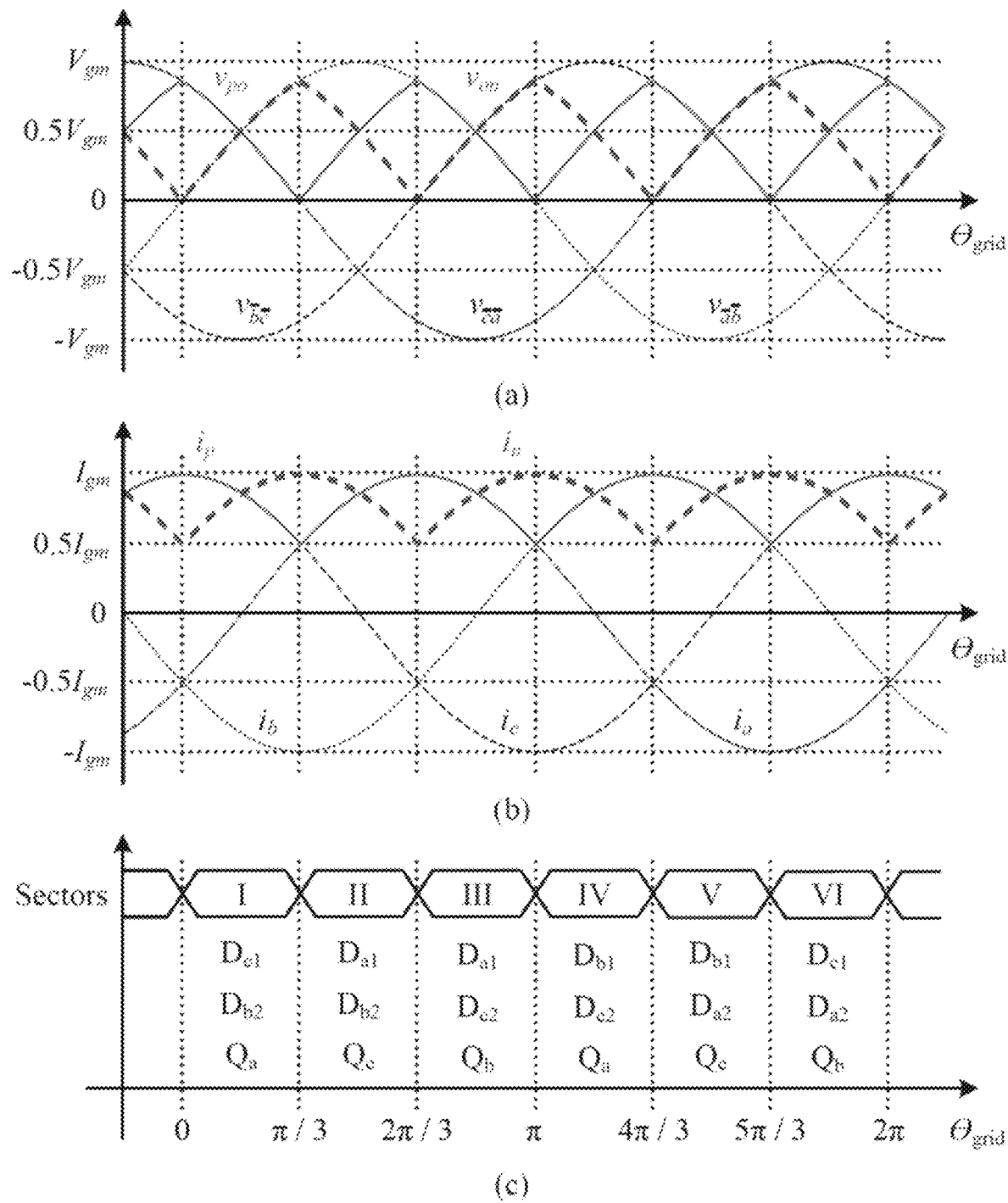
FIG. 3 is a diagram illustrating (a) 3-phase input voltages converted to pulsating DC-link voltages, $v_{po}$ and $v_{on}$, by an unfolder, (b) sinusoidal grid currents are shaped piecewise by controlling the input currents, $i_p$ and $i_n$, of the DC-DC conversion system, and (c) a switching sequence of the Unfolder switches determined in accordance with AC-voltage sectors, according to various embodiments.

The negative phase shift introduced by the LC resonance in the plant transfer function poses challenges for a proportional integral (PI) controller in achieving a positive phase margin and, consequently, stable closed-loop control. This challenge becomes particularly pronounced when the control bandwidth closely approaches or exceeds the LC resonant frequency. It is important to note that the controlled currents, $i_p$ and $i_n$, are 180 Hz quantities (three times the grid frequency, $f_{grid}$), as illustrated in FIG. 3(*b*). To effectively regulate these currents under both steady-state and dynamic conditions, it is advisable to have a control bandwidth greater than ten times their fundamental frequency of 180 Hz. However, this preference brings the control bandwidth close to the LC resonant frequency, posing challenges for a PI controller to maintain stable closed loop operation at such a higher bandwidth level due to the negative phase shift caused by the resonance.

VI. Active Damping Using Current Emulation Technique

Figure 14:
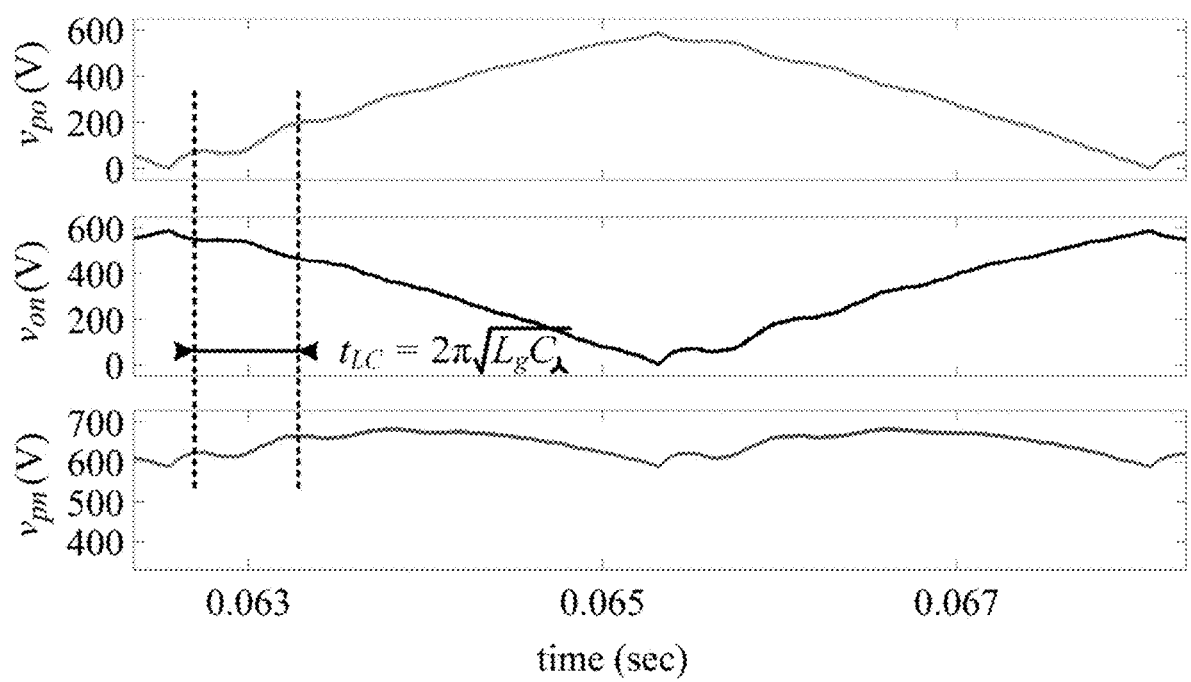
FIG. 14 is a diagram illustrating the interaction between the grid inductances and DC-link capacitors leads to LC oscillations in the DC-link voltages, $v_{po}$, $v_{on}$, and $v_{pn}$ where the time period of these oscillations is given as $t_{LC}=1/f_{LC}=2\pi\sqrt{L_g C_\lambda}$, according to various embodiments.
Figure 15:
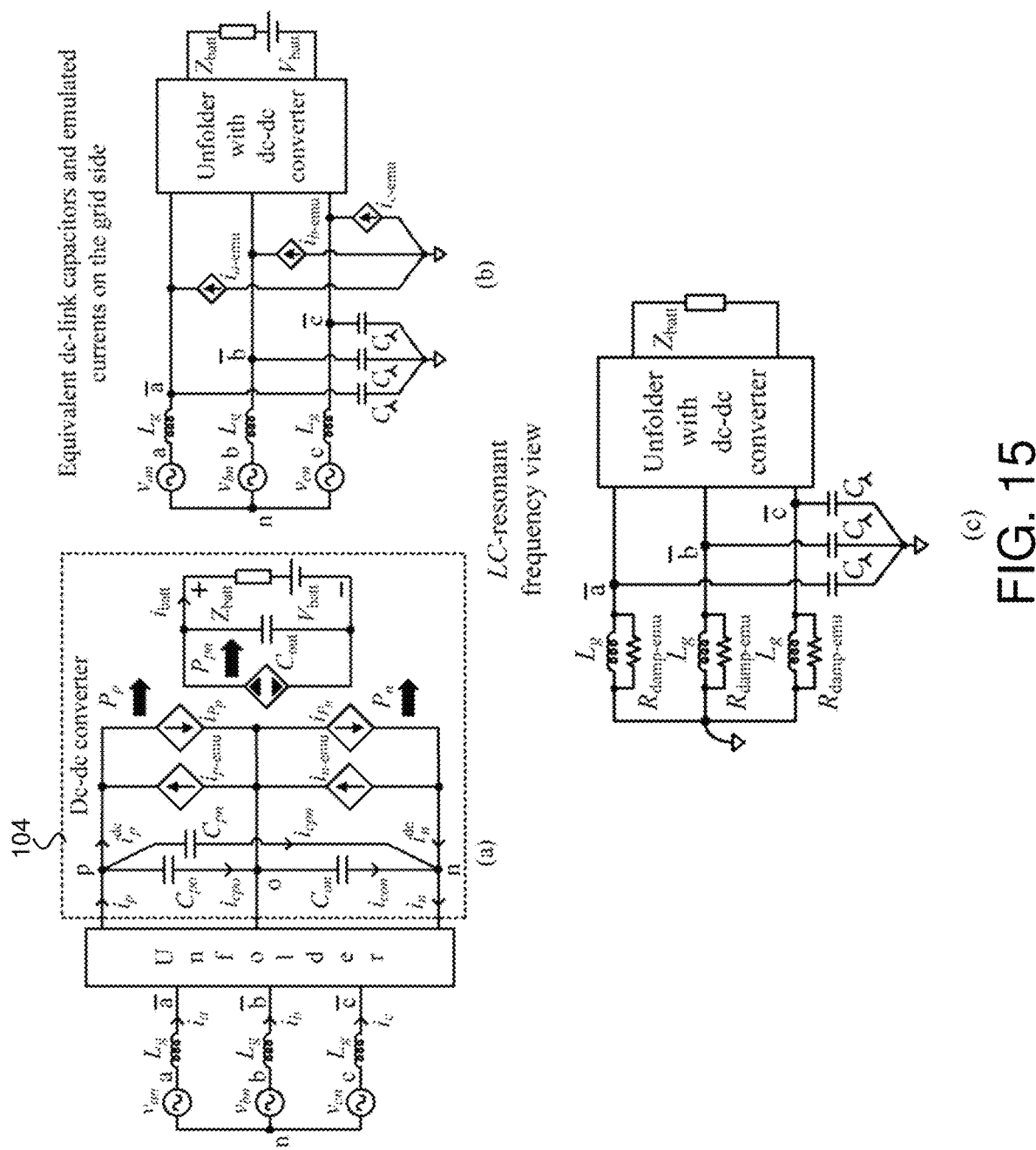
FIG. 15 is a schematic block diagram of (a) $i_{Pp}$ and $i_{Pn}$ supply power to the output battery, while $i_{p\text{-}emu}$ and $i_{n\text{-}emu}$ are emulated to provide active damping, (b) equivalent λ-connected DC-link capacitors and emulated currents on the grid side, and (c) emulated current sources/sinks can be viewed as damping resistors, $R_{damp\text{-}emu}$, connected across the grid inductances in the $f_{LC}$-frequency domain, according to various embodiments.

The interaction between the grid inductances and DC-link capacitors causes oscillations in DC-link voltages, $v_{po}$, $v_{on}$, and $v_{pn}$, as depicted in FIG. 14. To actively damp these oscillations, current sources/sinks ($i_{p\text{-}emu}$ and $i_{n\text{-}emu}$) are emulated using the T-type bridge-based DC-DC converter 408, in conjunction with current sources $i_{P_p}$ and $i_{P_n}$ responsible for powering the output battery. These emulated currents, illustrated in FIG. 15(*a*), either charge or discharge the DC-link capacitors when their voltages deviate from ideal values because of LC oscillations. These current sources/sinks, which help eliminate the LC oscillations in DC-link voltages, are given as $$i_{p\text{-}emu} = k_{emu}(v_{po\text{-}ideal} - v_{po}) = k_{emu}\Delta v_{po}, \quad (24)$$

$$i_{n\text{-}emu} = k_{emu}(v_{on\text{-}ideal} - v_{on}) = k_{emu}\Delta v_{on}, \quad (25)$$

where $k_{emu}$ denotes the proportionality constant. It is important to note that addressing $v_{po}$ and $v_{on}$ inherently takes care of LC oscillations present in $v_{pn}$ as per Kirchhoff's Voltage Law (KVL). The voltages $v_{po}$ and $v_{on}$, affected by the LC resonance, predominantly consist of the fundamental components of $3f_{grid}$ and $f_{LC}$ frequencies (neglecting switching frequency components caused by the DC-DC converter operation). Additionally, as the $3f_{grid}$-frequency components of these DC-link voltages closely match the ideal waveforms, and the ideal DC-link voltages do not have $f_{LC}$-frequency components, equations (24) and (25) can be simplified to $$i_{p\text{-}emu} = k_{emu}\left(\Delta v_{po}|_{3f_{grid}} + \Delta v_{po}|_{f_{LC}}\right) = -k_{emu}v_{po}|_{f_{LC}}, \quad (26)$$

$$i_{n\text{-}emu} = k_{emu}\left(\Delta v_{on}|_{3f_{grid}} + \Delta v_{on}|_{f_{LC}}\right) = -k_{emu}v_{on}|_{f_{LC}}, \quad (27)$$

where $v_{po}|f_{LC}$ and $v_{on}|f_{LC}$ are LC oscillations present in the actual $v_{po}$ and $v_{on}$ voltages. Consequently, the emulated current sources/sinks, $i_{p\text{-}emu}$ and $i_{n\text{-}emu}$, comprise only $f_{LC}$-frequency components.

Furthermore, by disregarding the negligible grid-frequency voltage drop across the grid inductances, the voltages across these inductances primarily exhibit $f_{LC}$-frequency components. (The grid inductance required for PFC in unfolding-based AC-DC topologies is significantly low. Hence, the voltage drop across this inductance, proportional to $\omega_{grid}L_g$, is considered negligible.) This phenomenon arises due to LC oscillations present in the unfolder's input line-to-line voltages, which are essentially piece-wise related to the DC-link voltages, $v_{po}$, $v_{on}$, and $v_{pn}$. These voltages across the grid-side inductances are therefore given by $$v_{j\text{-}L_g}\big|_{f_{LC}} = -v_{\overline{jn}}\big|_{f_{LC}} \quad \ldots \quad j \in \{a, b, c\}, \tag{28}$$

where $v_{\overline{jn}}(j \in \{a, b, c\})$ are the unfolder 102 input phase voltages. By combining equations (26)-(28) with the understanding that $v_{\overline{jn}}$ are fundamentally related to DC-link voltages, the voltages across grid inductances can be expressed as $$v_{j\text{-}L_g}\big|_{f_{LC}} = f(v_{po}\big|_{f_{LC}}, v_{on}\big|_{f_{LC}}) = f\left(\frac{i_{p\text{-}emu}}{k_{emu}}, \frac{i_{p\text{-}emu}}{k_{emu}}\right). \tag{29}$$

As the T-type bridge-based DC-DC system 408 provides balanced loading at the output of the unfolder 102 which operates at a much lower frequency than the LC resonant frequency, a transformative approach can be taken. This involves relocating the Δ-connected DC-link capacitors along with the emulated currents, $i_{p\text{-}emu}$ and $i_{n\text{-}emu}$, to the grid side and representing them in a λ-connected configuration, as depicted in FIG. 15(b). The values of these individual emulated phase currents are $$i_{a\text{-}emu} = -k_{emu}(v_{\overline{ab}}\big|_{f_{LC}} - v_{\overline{ca}}\big|_{f_{LC}}) = 3k_{emu}v_{a\text{-}L_g}\big|_{f_{LC}}, \tag{30}$$

$$i_{b\text{-}emu} = -k_{emu}(v_{\overline{bc}}\big|_{f_{LC}} - v_{\overline{ab}}\big|_{f_{LC}}) = 3k_{emu}v_{b\text{-}L_g}\big|_{f_{LC}}, \tag{31}$$

$$i_{c\text{-}emu} = -k_{emu}(v_{\overline{ca}}\big|_{f_{LC}} - v_{\overline{bc}}\big|_{f_{LC}}) = 3k_{emu}v_{c\text{-}L_g}\big|_{f_{LC}}. \tag{32}$$

From the above equations, it becomes apparent that the emulated current sources/sinks introduce additional currents into the system, which are directly proportionate to the voltages across the grid inductances. Consequently, these currents mimic virtual resistors placed across the grid inductances by emulating additional currents that should flow into the virtual resistors ($=v_{j\text{-}L_g}|f_{LC}/R_{damp\text{-}emu}$). Designated as $R_{damp\text{-}emu}$, the virtual resistor is emulated in the higher $f_{LC}$-frequency domain and is a function of the parameter $k_{emu}$. An illustration of this interpretation of the emulated currents is presented in FIG. 15(c). Upon examination of equations (30)-(32), the value of $R_{damp\text{-}emu}$ can be computed as $1/(3k_{emu})$.

Figure 16:
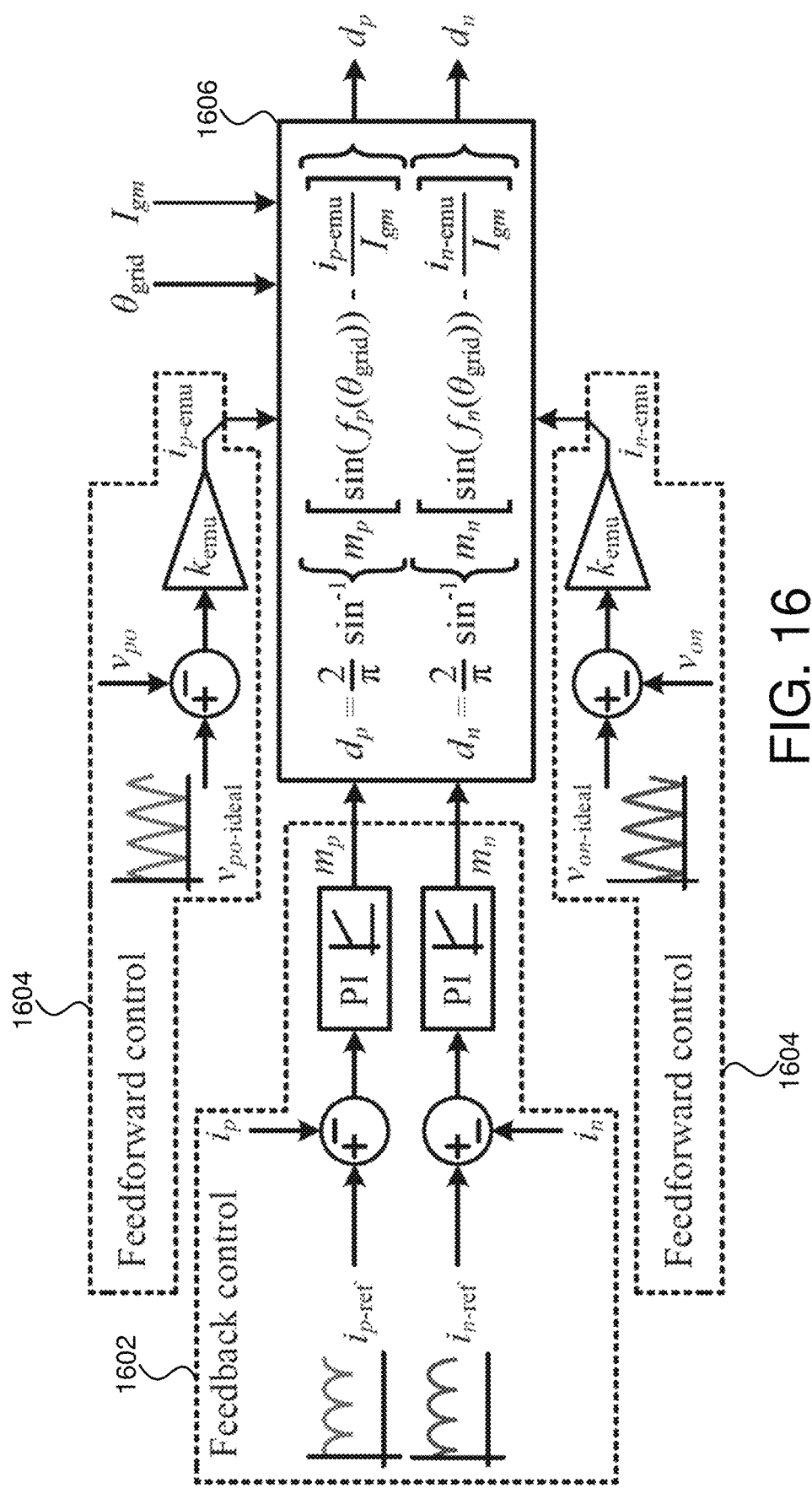
FIG. 16 is a schematic block diagram illustrating a control structure for the T-type bridge-based DC-DC conversion system, with output power regulation and input PFC through feedback control where active damping is provided using emulated current sources/sinks via a feedforward technique, according to various embodiments.

The control diagram of FIG. 16 includes a feedback control loop 1602 with outputs of a p-terminal modulation index $m_p$ derived from a difference between p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$. In some embodiments, the p-terminal reference current $i_{p\text{-}ref}$ and the n-terminal reference current $i_{n\text{-}ref}$ comprise a scaled representation of an idealized p-terminal current $i_p$ and an idealized n-terminal current $i_n$ without oscillations caused by a resonance between the grid inductances from the three-phase AC power source and capacitance of the input capacitors of the T-type bridge.

FIG. 16 also illustrates a feedforward control loop 1604 that includes outputs of an emulated p-terminal current $i_{p\text{-}emu}$ derived from a difference between a p-terminal DC-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between a n-terminal DC-link voltage $v_{on}$ measured across the o-terminal and the n-terminal and an ideal n-terminal DC-link voltage $v_{on\text{-}ideal}$. FIG. 16 also includes a duty cycle controller 1606 configured to generate duty cycles $d_p$, $d_n$ controlling the switches of the T-type bridge. The duty cycles are derived from the p-terminal modulation index $m_p$, the emulated p-terminal current $i_{p\text{-}emu}$, the n-terminal modulation index $m_n$, and the emulated n-terminal current $i_{n\text{-}emu}$. In some embodiments, the duty cycle controller 1606 is configured to generate a p-terminal duty cycle $d_p$ controlling a first portion of switches of the T-type bridge where the p-terminal duty cycle $d_p$ is derived from the p-terminal modulation index $m_p$ and the emulated p-terminal current $i_{p\text{-}emu}$. In some embodiments, the duty cycle controller 1606 is also configured to generate an n-terminal duty cycle $d_n$ controlling a second portion of switches of the T-type bridge where the n-terminal duty cycle $d_n$ is derived from the n-terminal modulation index $m_n$ and the emulated n-terminal current $i_{n\text{-}emu}$.

In the feedback control loop 1602, $i_{p\text{-}emu}$ and $i_{n\text{-}emu}$ are emulated by incorporating feedforward terms in the closed-loop control of the T-type bridge-based DC-DC system 408, as depicted in FIG. 16, while determining the duty ratios $d_p$ and $d_n$. These modified duty ratios are given as:

$$d_p = \frac{2}{\pi}\sin^{-1}\left(m_p\left(\sin(f_p(\theta_{grid})) - \frac{i_{p\text{-}emu}}{I_{gm}}\right)\right), \tag{33}$$

$$d_n = \frac{2}{\pi}\sin^{-1}\left(m_n\left(\sin(f_n(\theta_{grid})) - \frac{i_{n\text{-}emu}}{I_{gm}}\right)\right), \tag{34}$$

where $m_p$ and $m_n$ represent the p-terminal and n-terminal modulation indexes, respectively, which are outputs of the PI controllers. $\theta_{grid}$ is the angle of $v_{\overline{ab}}$ determined by the phase-locked loop (PLL). $f_p$ and $f_n$ denote functions with respect to $\theta_{grid}$, as specified in TABLE I, and $I_{gm}$ is the peak of grid currents.

TABLE I

Values of $f_p$ and $f_n$ used to calculate $d_p$ and $d_n$ for different AC-voltage sectors.

| Sector | Grid angle ($\angle v_{\overline{ab}}$) | $f_p$ | $f_n$ |
|---|---|---|---|
| I | $0 \leq \theta_{grid} < \pi/3$ | $\theta_{grid} + \pi/2$ | $\theta_{grid} + \pi/6$ |
| II | $\pi/3 \leq \theta_{grid} < 2\pi/3$ | $\theta_{grid} - \pi/6$ | $\theta_{grid} + \pi/6$ |
| III | $2\pi/3 \leq \theta_{grid} < \pi$ | $\theta_{grid} - \pi/6$ | $\theta_{grid} - \pi/2$ |
| IV | $\pi \leq \theta_{grid} < 4\pi/3$ | $\theta_{grid} - 5\pi/6$ | $\theta_{grid} - \pi/2$ |
| V | $4\pi/3 \leq \theta_{grid} < 5\pi/3$ | $\theta_{grid} - 5\pi/6$ | $\theta_{grid} - 7\pi/6$ |
| VI | $5\pi/3 \leq \theta_{grid} < 2\pi$ | $\theta_{grid} + \pi/2$ | $\theta_{grid} - 7\pi/6$ |

Figure 17:
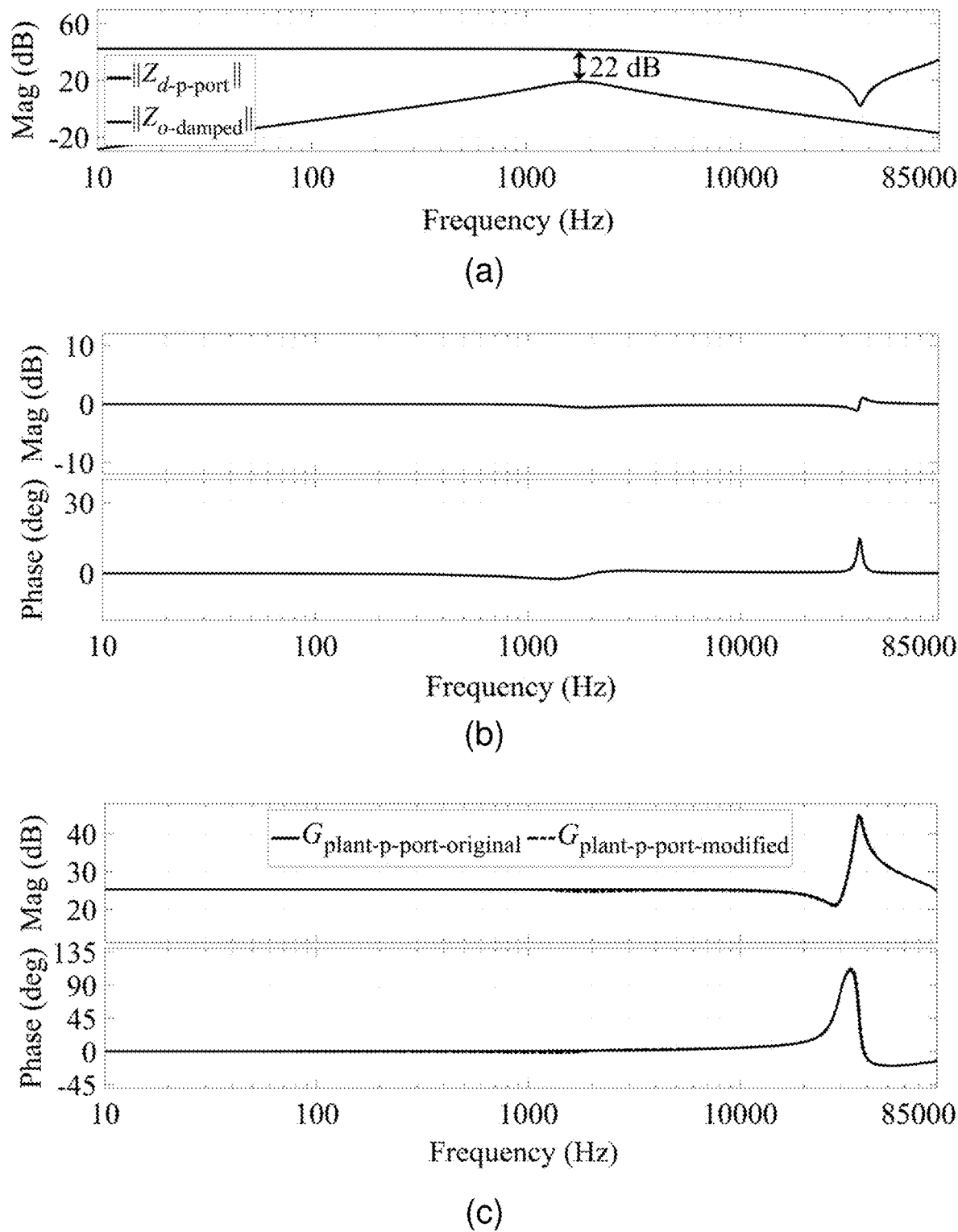
FIG. 17 illustrates Bode plots of (a) damping of the LC resonance using $R_{damp\text{-}emu}=9\,\Omega$ achieved through the current emulation technique, (b) a correction factor $G_{cf}$ maintained close to unity, and (c) a comparison between the original plant transfer function ($G_{plant\text{-}p\text{-}terminal\text{-}original}$) and the modified plant transfer function ($G_{plant\text{-}p\text{-}terminal\text{-}modified}$), indicating that the plant is negligibly affected by the LC resonance due to the current emulation-based active damping, according to various embodiments.

Utilizing the current emulation-based active damping, the LC resonance between the grid inductances and DC-link capacitors is effectively damped, as illustrated in FIG. 17(a). The chosen value of $R_{damp\text{-}emu} = 9\Omega$ is considered suitable.

This ensures that, over the grid cycle, the magnitude of the damped LC resonance, $\|Z_{o\text{-}damped}\||f=f_{LC}=R_{damp\text{-}emu}=19.08$ dB, remains at least 20 dB lower (i.e., 1/10th) than the minimum value of $\|Z_{d\text{-}p\text{-}terminal}\||f=f_{LC}=41.27$ dB (check FIG. 12(a)) at the resonant frequency. This meets the criteria outlined in equation (5) and ensures that the correction factor, $G_{cf}$, stays close to unity (check FIG. 17(b)). (In this study, the condition related to $\|Z_{n\text{-}p\text{-}terminal}\|$ is always satisfied due to its infinite value, as discussed in Section V.) Consequently, the plant transfer function, $G_{plant\text{-}p\text{-}terminal}$, remains unaffected, as depicted in FIG. 17(c). Observing FIG. 17(c), it becomes apparent that the modified plant transfer function, $G_{plant\text{-}p\text{-}terminal\text{-}modified}$, closely matches the original plant transfer function, $G_{plant\text{-}p\text{-}terminal\text{-}original}$, with negligible magnitude and phase deviations of −0.6 dB and −1.3°, respectively, at the resonant frequency. Notably, there is no undesirable '−360°' phase shift in the phase Bode plot, as observed in the case without active damping. This allows a PI controller to achieve a positive phase margin and ensure stable closed-loop operation of the T-type bridge-based DC-DC conversion system 408.

VII. Simulation Results

Figure 18:
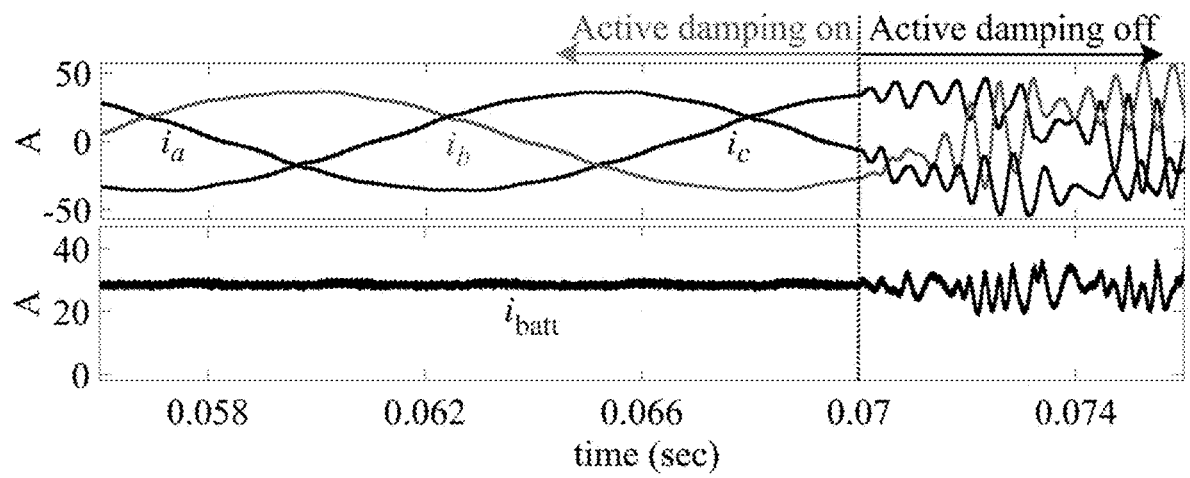
FIG. 18 depicts simulation results of the 20-kW unfolding-based AC-DC system reveal unstable oscillatory responses in both battery and grid currents when the active damping based on current emulation is disabled at t=0.07 sec where the closed-loop bandwidth is configured to 1.8 kHz, closely aligned with the LC resonance at 1.77 kHz, according to various embodiments.
Figure 19:
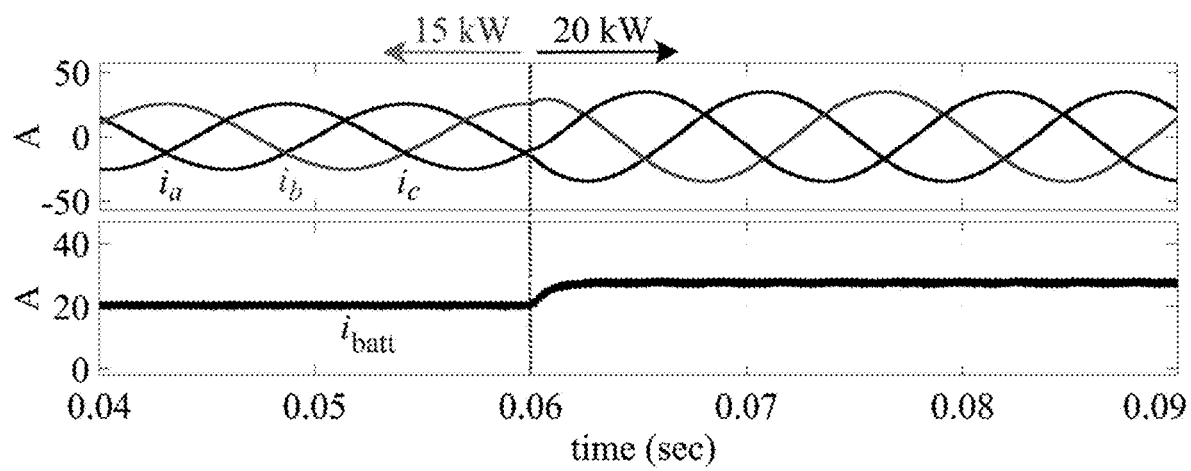
FIG. 19 depicts a simulation-based step response of the unfolding-based AC-DC system at the closed-loop bandwidth of 1.8 kHz with active damping enabled where output power has given a step change from 15 kW to 20 kW at t=0.06 sec, according to various embodiments.

A 20-kW grid-tied unfolding-based EV-battery charging system with a T-type bridge-based DC-DC converter 408, as depicted in FIG. 4, is simulated using PLECS. The system parameters used for the simulation are given in TABLE II. The simulation results, as presented in FIG. 18, reveal unstable oscillations in both battery and grid currents when the active damping based on current emulation is turned off. This instability arises due to the observed '−360°' phase shift in the phase Bode plot of the plant transfer function, $G_{plant\text{-}p\text{-}terminal}$, when the active damping is disabled. Consequently, a negative phase margin is obtained by utilizing a PI controller configured (check TABLE III) to attain a closed-loop bandwidth of 1.8 kHz, slightly above the LC resonant frequency of 1.77 kHz. The stable performance of the active damping is also checked in transient conditions by giving a step change in the output power, from 15 kW to 20 kW, as shown in FIG. 19.

Figure 20:
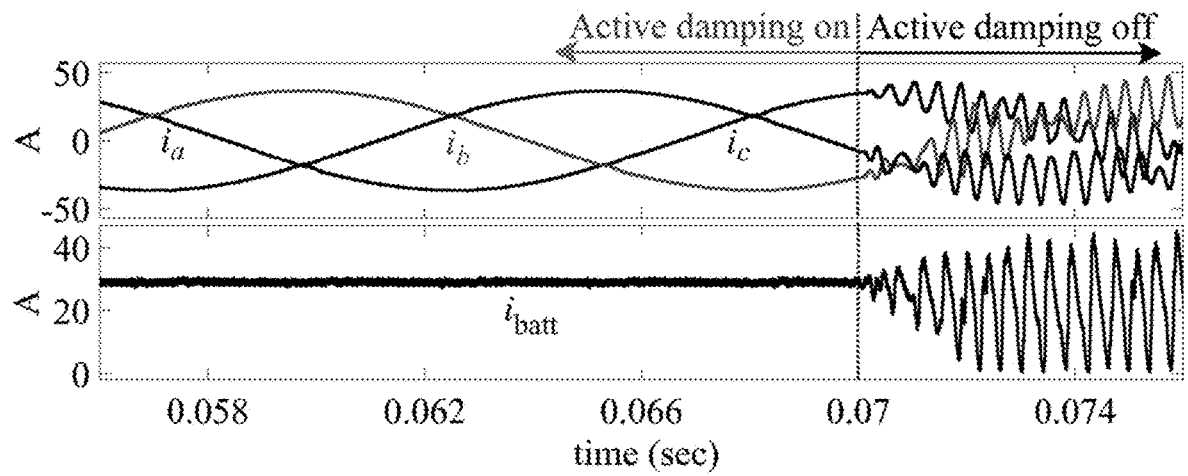
FIG. 20 depicts simulation results of the 20-kW unfolding-based AC-DC system reveal unstable oscillatory responses in both battery and grid currents when the active damping based on current emulation is disabled at t=0.07 sec. In this case, the closed-loop bandwidth is configured to be 3 kHz, which is much higher than the LC resonance at 1.77 kHz, according to various embodiments.
Figure 21:
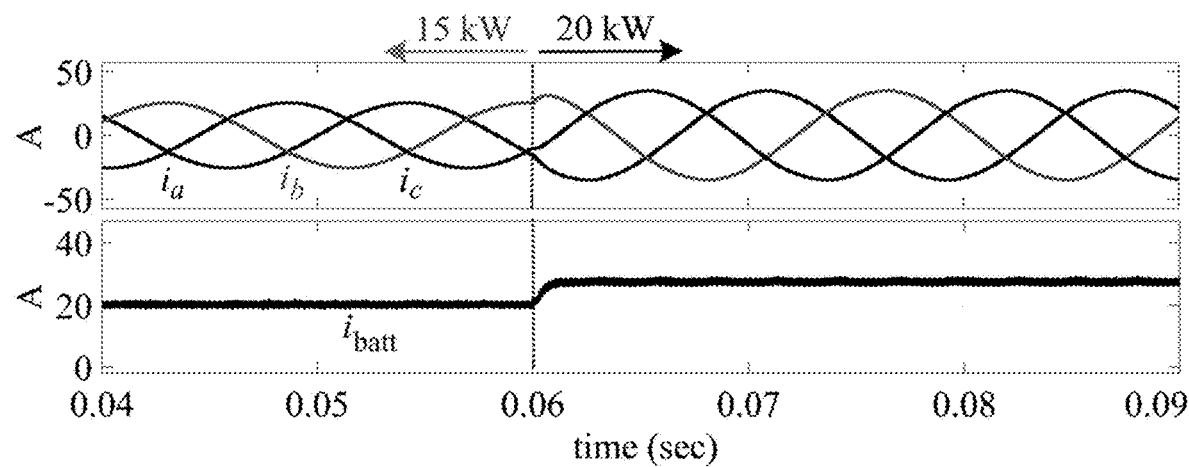
FIG. 21 depicts a simulation-based step response of the unfolding-based AC-DC system at the closed-loop bandwidth of 3 kHz with active damping enabled where the output power has given a step change from 15 kW to 20 kW at t=0.06 sec, according to various embodiments.

Moreover, the active damping is tested at a bandwidth level of 3 kHz, significantly higher than the LC resonant frequency. The corresponding simulation results provided in FIG. 20 demonstrate the stable operation of the unfolding based AC-DC system when the active damping is active. A stable transient response at this higher bandwidth level is depicted in FIG. 21, where the output power of the converter undergoes a step change from 15 kW to 20 kW.

TABLE II

System parameters of the unfolding-based AC-DC converter.

| Parameter | Value |
| --- | --- |
| Nominal input voltage | 480 V (line-line), 60 Hz |
| Battery voltage | 649 V-755 V |
| Output power | 20 kW |
| T-type bridge switching frequency | 85 kHz |
| Unfolder switching frequency | Diodes - 60 Hz, IGBTs - 120 Hz |
| Grid inductance ($L_g$) | 600 μH |
| DC-link capacitors ($C_{po}$, $C_{on}$, and $C_{pn}$) | 4.5 μF |
| Equivalent grid-side capacitors ($C_\lambda$) | 13.5 μF |
| LC resonant frequency ($f_{LC}$) | 1.77 kHz |
| $L_p$ | 29.3 μH |
| $C_{pp}$ | 120.1 nF |
| $C_{ps}$ | 112.1 nF |

TABLE II-continued

System parameters of the unfolding-based AC-DC converter.

| Parameter | Value |
| --- | --- |
| Cantilever model-based transformer parameters | |
| $L_l$ | 37.5 μH |
| $L_m$ | 996.2 μH |
| $C_{out}$ | 161.5 μF |
| $k_{emu}$ | 0.037 A/V |
| $R_{damp\text{-}emu}$ | 9 Ω |

TABLE III

PI controller ($G_{PI}$) parameters for various closed-loop bandwidth values.

| Bandwidth (Hz) | $K_{p\text{-}PI}$ | $K_{i\text{-}PI}$ |
| --- | --- | --- |
| 300 | 0.001 | 36.6 |
| 1800 | 0.001 | 251.4 |
| 3000 | 0.001 | 380.1 |

VIII. Experimental Validation

A 20-kW hardware prototype of an unfolding-based AC-DC system with a T-type bridge-based DC-DC converter 408 was built and tested to validate the proposed control solution of current emulation-based active damping. The corresponding hardware parameters are summarized in TABLE II. IXYS® WT1263Y200 diodes and Infineon® FZ1200R17KF6CB2 insulated-gate bi-polar transistors (IGBTs) are employed in designing the 3-ϕ unfolder 102. The T-type bridge 402 utilized in the three-port DC-DC system is built using Onsemi® NVH4L020N120SC1 and NVH4L040N120SC1 metal-oxide semiconductor field-effect transistors (MOSFETs), with the body-diodes of CREE® CCS050M12CM2 MOSFETs used for the diode bridge on the secondary side. The emulation of the grid is performed using California Instruments™ MX-30, while NH Research™ 9300 is employed in battery mode to emulate an EV battery at the output terminal.

The hardware verification begins by validating the phasor transformation-based small-signal modeling of the T-type bridge-based DC-DC system 408. Following this, the unfolding based AC-DC system is tested at different closed-loop bandwidths without the control-based damping. Lastly, the software platform of the TMS320F28379D microcontroller is utilized to implement the current emulation-based active damping logic to damp the LC resonance and test the operation of the AC-DC system at different closed-loop bandwidth values.

A. Hardware Validation of the Phasor Transformation-Based Small-Signal Modeling

To validate the phasor transformation-based small-signal modeling employed in the embodiments described herein, an independent test is conducted on the T-type bridge-based DC-DC conversion system 408. This system comprises an LCC tank with a transformer and a secondary-side diode bridge rectifier. Two DC-voltage sources, manufactured by Regatron™, are connected to the inputs of the T-type bridge 402, while a DC-voltage sink (NH Research 9300) serves as a battery at the output. The modeling verification is carried out for the plant transfer function, $G_{plant\text{-}p\text{-}terminal}=\hat{i}_p/\hat{d}_p$, at 4 kW of output power. In this hardware testing, since only the DC-DC conversion system is involved without grid connection, the obtained plant reflects the original plant transfer function, $G_{plant\text{-}p\text{-}terminal\text{-}original}$, without being influenced by the LC resonance.

Figure 22:
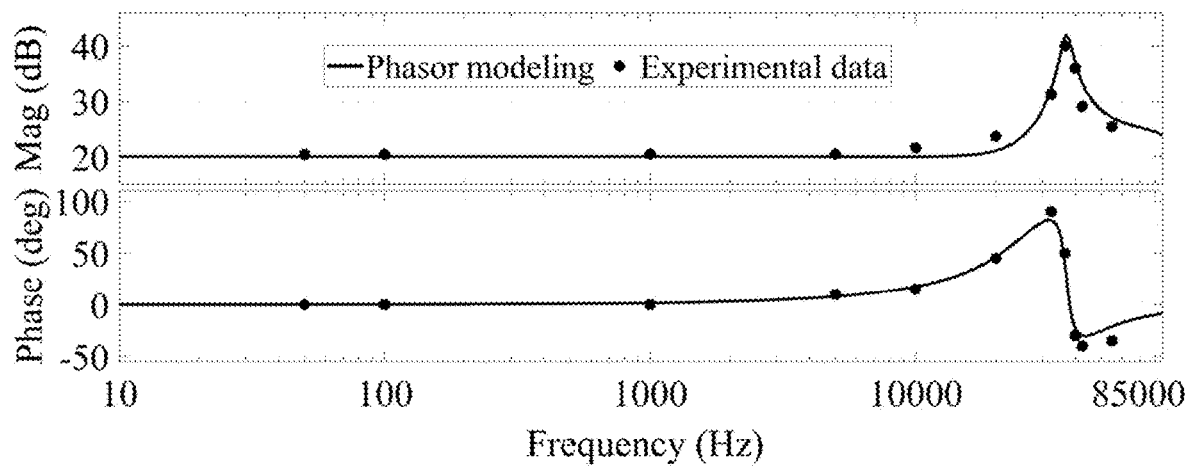
FIG. 22 depicts a comparison of Bode plots of the plant transfer function ($G_{plant\text{-}p\text{-}terminal}=\hat{i}_p/\hat{d}_p$) of the T-type bridge-based DC-DC conversion system, obtained from the complete higher-order phasor transformation-based small signal modeling and hardware testing, according to various embodiments.

In this verification, the p-terminal duty ratio, $d_p$, is sinusoidally perturbed by ±0.1 around a steady-state value of $D_p|_{\theta_{grid}=\pi/15}=0.857$. The perturbation is performed across a range of frequencies: 50 Hz, 100 Hz, 1 kHz, 5 kHz, 10 kHz, 20 kHz, 32.5 kHz, 36.6 kHz, 40 kHz, 42.5 kHz, and 55 kHz. The resulting magnitude and phase of the perturbation-frequency component present in the p-terminal current, $i_p$, are measured to derive the Bode plots, as depicted in FIG. 22. FIG. 22 illustrates a comparison between the experimental Bode plots of $G_{plant-p-terminal}$ and those derived from the small-signal modeling. The close similarity between the two sets of plots confirms the accuracy and reliability of the modeling process.

B. Unfolding-Based AC-DC System Operation without Active Damping

Figure 23:
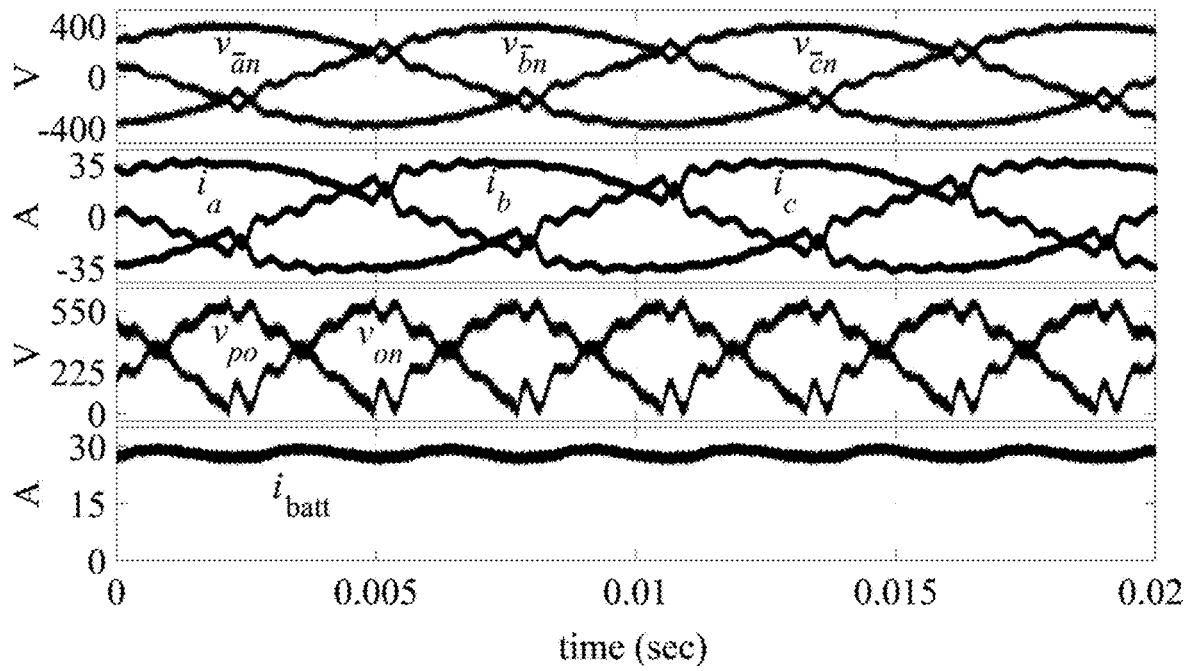
FIG. 23 depicts experimental results of the 20-kW unfolding-based AC-DC system operating at a closed-loop bandwidth of 300 Hz without active damping as follows: (a) oscillatory 3-ϕ AC input voltages, grid currents, DC-link voltages, and output battery current, (b) a high grid current THD of 9.15%, measured using a Yokogawa® WT1806E power analyzer, (c) Bode plots of the loop transfer function, $G_{L\text{-}p\text{-}terminal}$, indicating a positive phase margin at the gain crossover frequency of 300 Hz ($G_{PI}$ parameters: $K_{p\text{-}PI}=0.001$ and $K_{i\text{-}PI}=36.6$), and (d) the corresponding Nyquist plot, which does not encircle the point (−1, j0), confirming a stable closed-loop operation, according to various embodiments.
Figure 23:
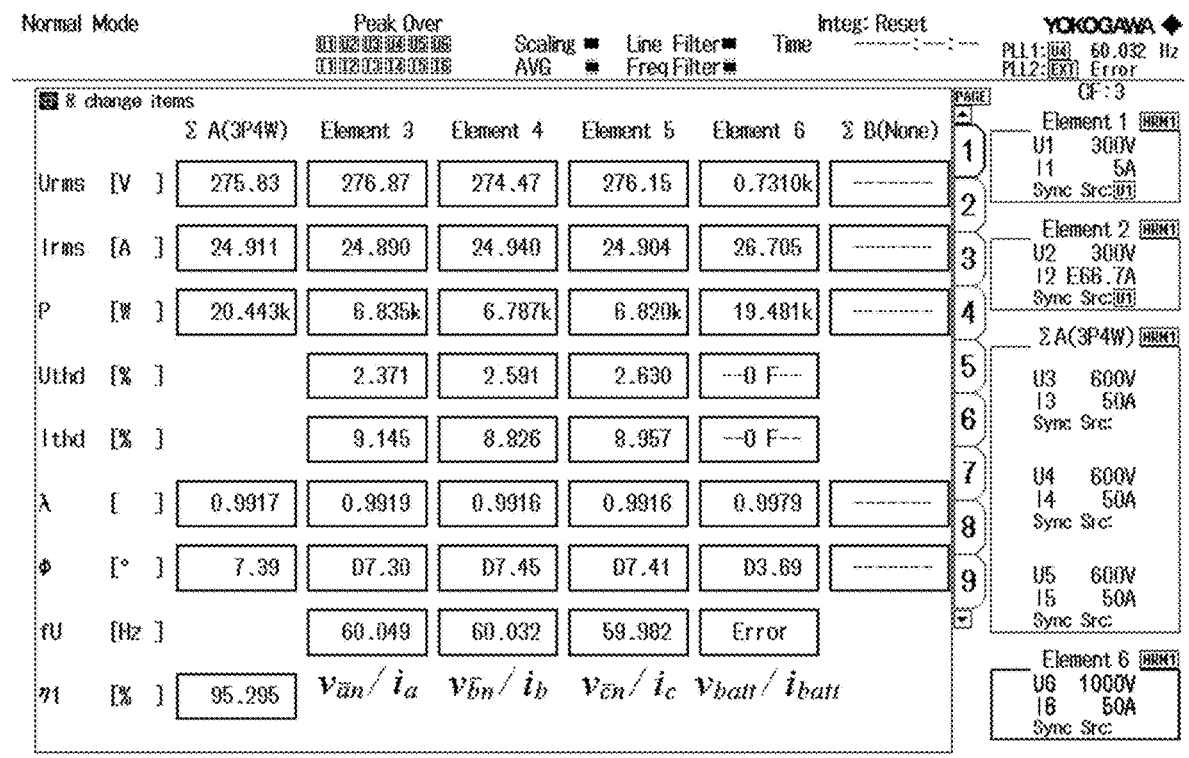
Figure 23:
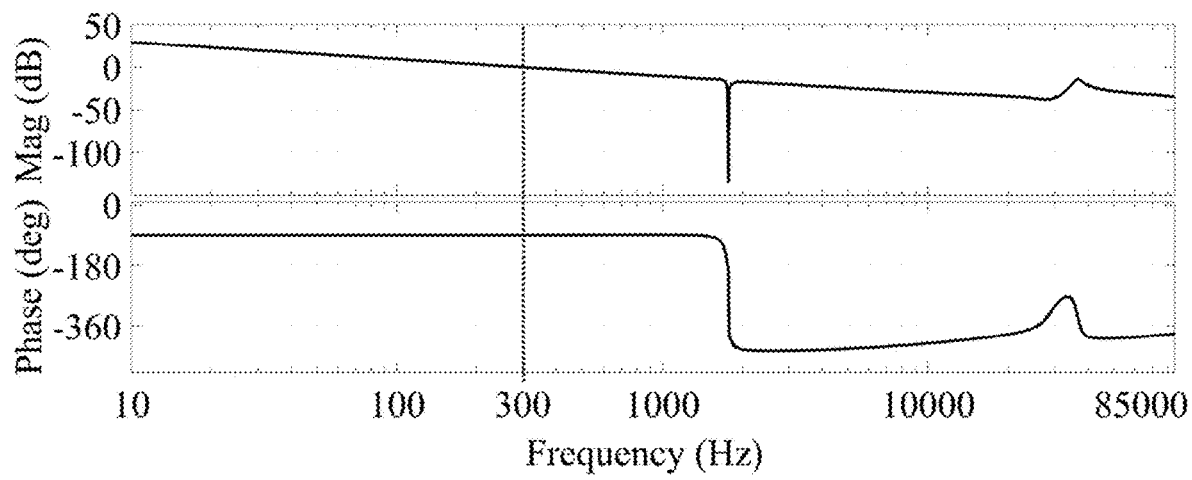
Figure 23:
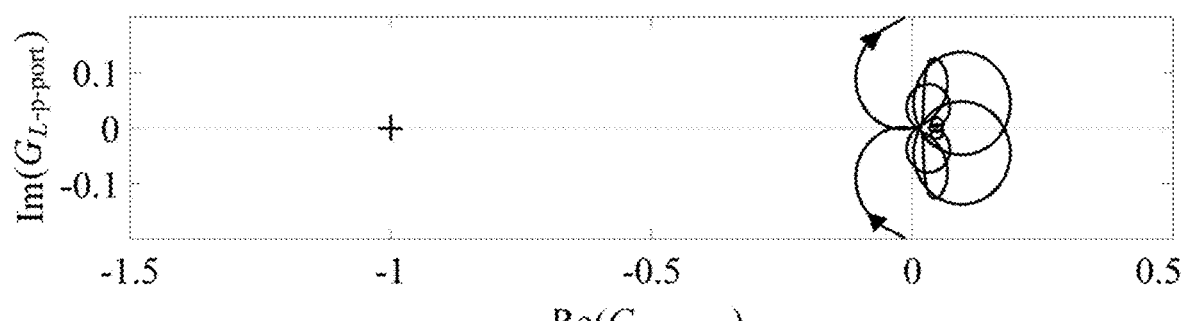

The hardware prototype of the unfolding-based AC-DC system is tested at an output power of 20 kW, without the current emulation-based active damping to observe the impact of the LC resonance on the system operation. Initially, the closed loop bandwidth of the T-type bridge-based DC-DC converter control is set to 300 Hz, a value much lower than the LC resonant frequency of 1.77 kHz. The corresponding PI controller parameters are provided in TABLE III. In FIG. 23(a), hardware results depict the 3-ϕ AC input voltages, grid currents, DC-link voltages, and the output battery current. Due to the considerably lower bandwidth of 300 Hz compared to the LC resonant frequency, stable closed-loop operation is observed. The corresponding Bode plots of the p-terminal loop transfer function, calculated as $$G_{L-p-terminal} = G_{PI} K_{m_p}^{d_p} G_{plant-p-terminal}, \quad (35)$$

are given in FIG. 23(c), where $G_{PI}$ represents the PI controller, and $$K_{m_p}^{d_p}$$

is the small-signal gain of the expression given in that relates $\hat{d}_p$ and $\hat{m}_p$ as $$K_{m_p}^{d_p} = \frac{\hat{d}_p}{\hat{m}_p} = \frac{2}{\pi} \frac{\sin(f_p(\theta_{grid}))}{\cos\left(\frac{\pi}{2}D_p\right)}. \quad (36)$$

The value of $K_{m_p}^{d_p}$ at $\theta_{grid}=\pi/15$ is 2.79. Moreover, the associated Nyquist plot presented in FIG. 23(d), which does not encircle the point (−1, j0), confirms the stability of the closed-loop operation. Despite the stable AC-DC operation at this lower bandwidth without active damping, sustained undesirable LC oscillations are observed in the waveforms, as seen in FIG. 23(a). This leads to a high total harmonic distortion (THD) of 9.15% in grid currents, as depicted in FIG. 23(b), obtained from the Yokogawa WT1806E power analyzer. Such oscillatory response results in poor AC-DC power delivery.

Figure 24:
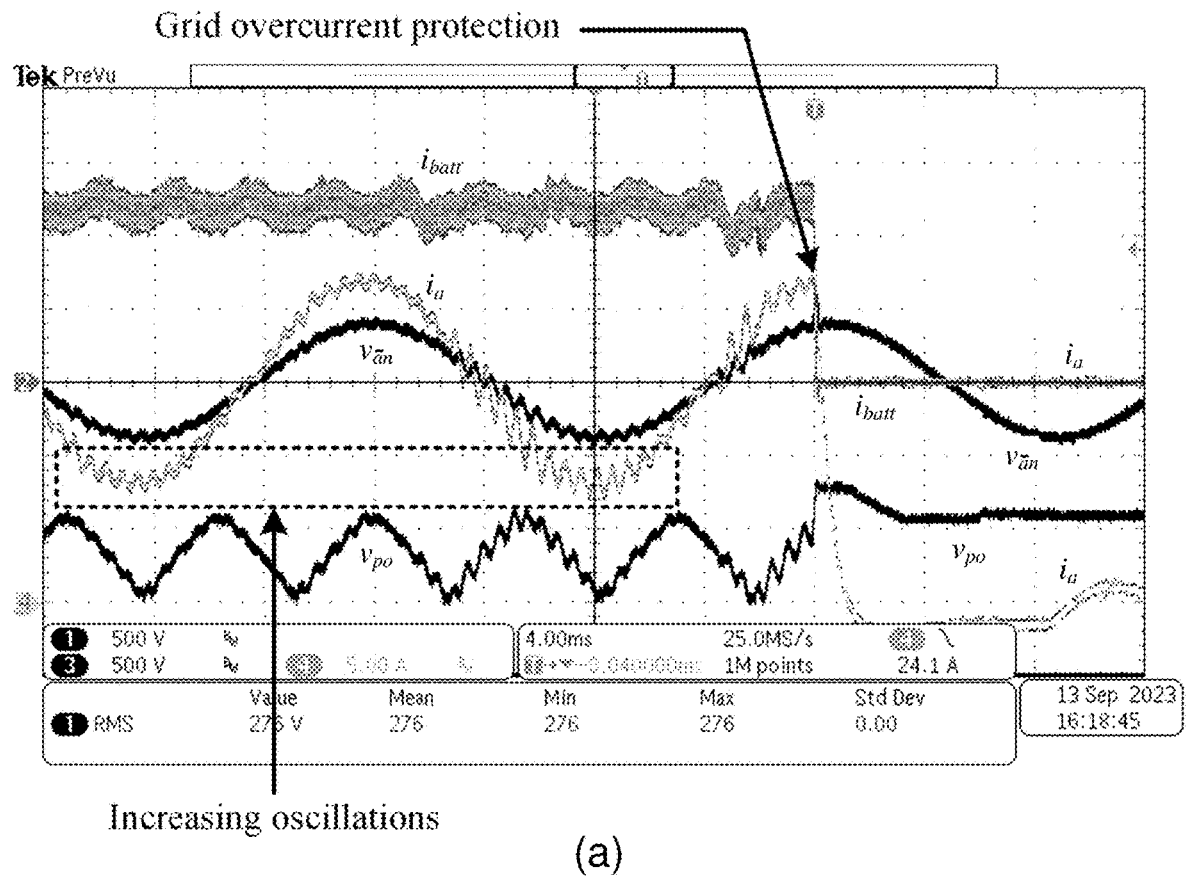
FIG. 24 depicts experimental results of the 20-kW unfolding-based AC-DC system operating at a closed-loop bandwidth of 1.8 kHz without active damping are illustrated as follows: (a) unstable and increasing oscillations in the system waveforms are observed, leading to grid-overcurrent shutdown, (b) Bode plots of the loop transfer function, $G_{L\text{-}p\text{-}terminal}$, indicating a negative phase margin at the gain crossover frequency of 1.8 kHz ($G_{PI}$ parameters: $K_{p\text{-}PI}=0.001$ and $K_{i\text{-}PI}=251.4$) where a positive phase margin cannot be achieved above the LC resonant frequency with a PI controller in the absence of active damping, leading to instability, according to various embodiments.
Figure 24:
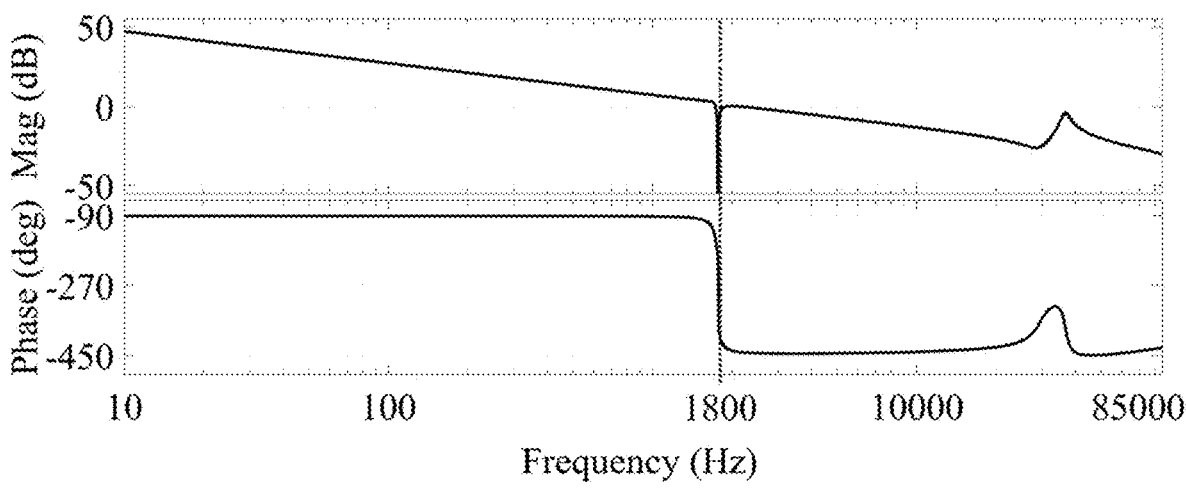

Subsequently, the closed-loop bandwidth of the T-type bridge-based DC-DC converter control is increased to 1.8 kHz, close to the LC resonant frequency. In FIG. 24(a), the hardware results depict the 3-ϕ AC input voltages, grid currents, DC-link voltages, and the output battery current. As the phase Bode plot of the plant without any damping undergoes a '−360°' phase shift at the resonant frequency (as discussed in Section V), the PI controller cannot achieve a positive phase margin, as shown in FIG. 24(b). This results in an unstable closed-loop operation, leading to growing oscillations in the grid currents, as depicted in FIG. 24(a). Consequently, the grid-overcurrent fault, employed for protection purposes, is triggered due to such growing oscillations, resulting in a system shutdown. To summarize, in the absence of current emulation-based active damping, stable operation is not achieved at closed-loop bandwidth values near the LC resonant frequency. Moreover, undesirable oscillatory AC-DC power delivery is observed, even at a lower 300 Hz closed-loop bandwidth, leading to a higher grid current THD.

Figure 25:
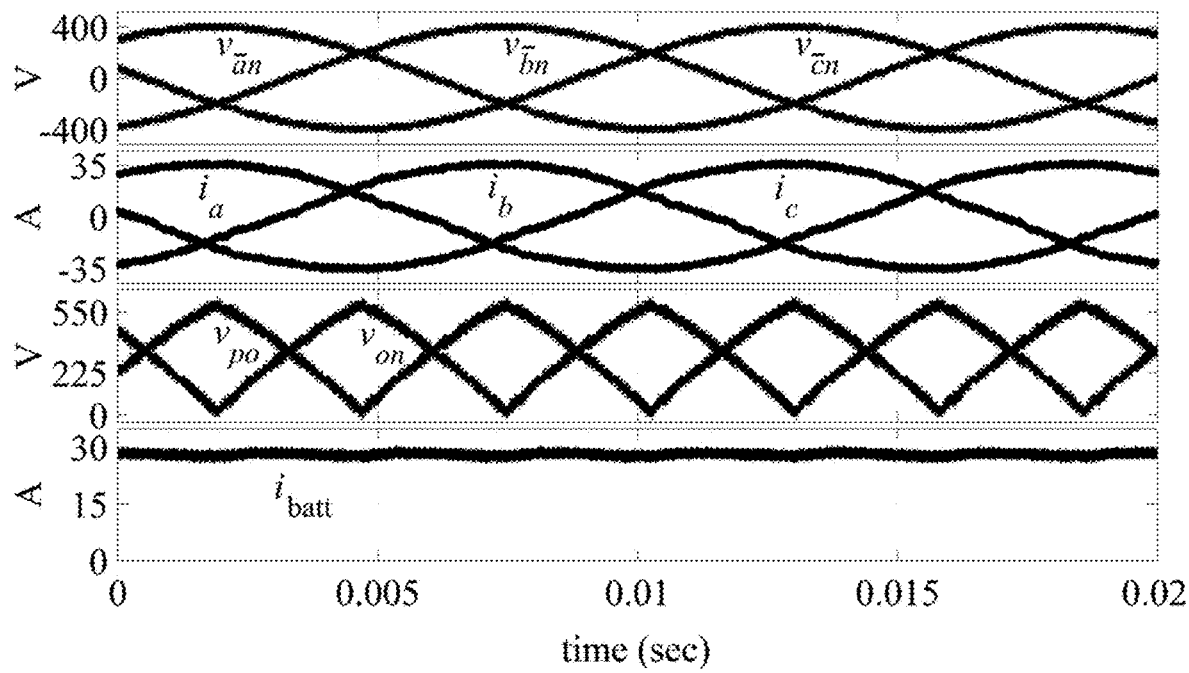
FIG. 25 depicts experimental results of the 20-kW unfolding-based AC-DC system operating at a closed-loop bandwidth of 1.8 kHz with active damping are illustrated as follows: (a) stable 3-ϕ ac input voltages, grid currents, DC-link voltages, and output battery current, (b) a low grid current THD of 2.26%, measured using the Yokogawa WT1806E power analyzer, (c) Bode plots of the loop transfer function, $G_{L\text{-}p\text{-}terminal}$, indicating a positive phase margin at the gain crossover frequency of 1.8 kHz ($G_{PI}$ parameters: $K_{p\text{-}PI}=0.001$ and $K_{i\text{-}PI}=251.4$), and (d) the corresponding Nyquist plot, which does not encircle the point (−1, j0), confirming a stable closed-loop operation, according to various embodiments.
Figure 25:
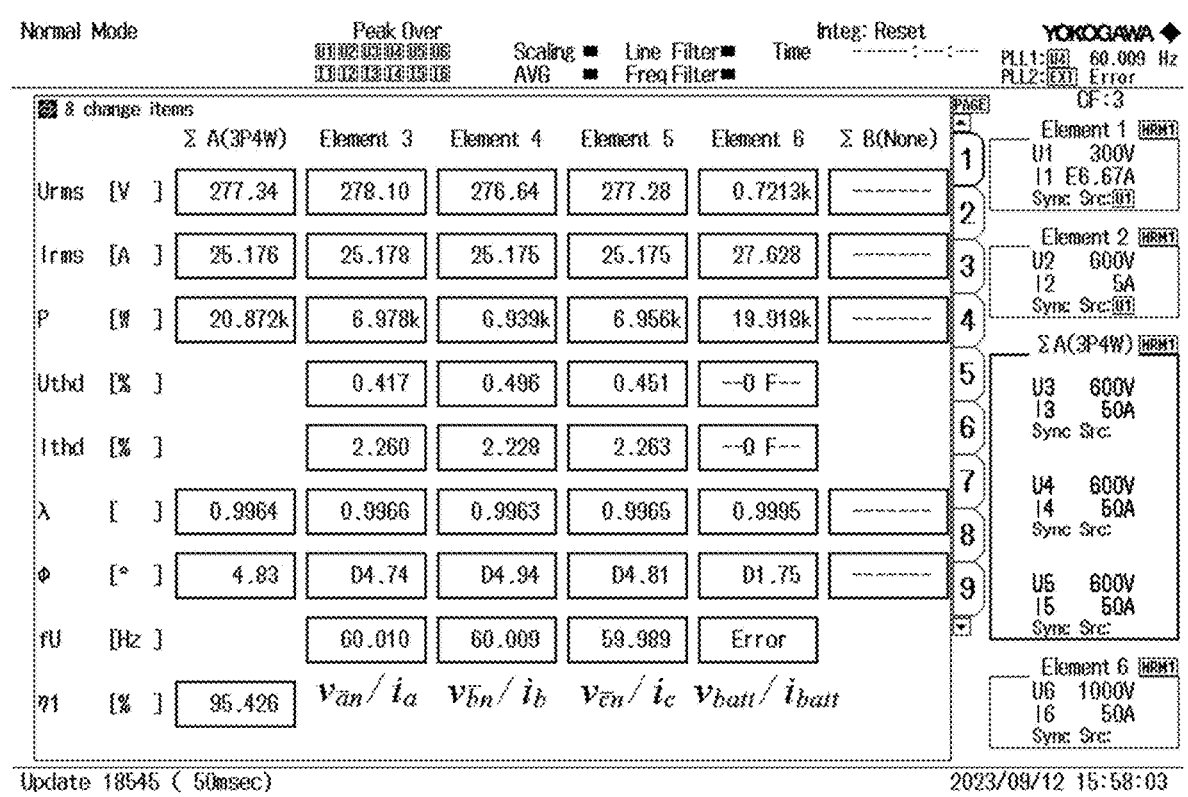
Figure 25:
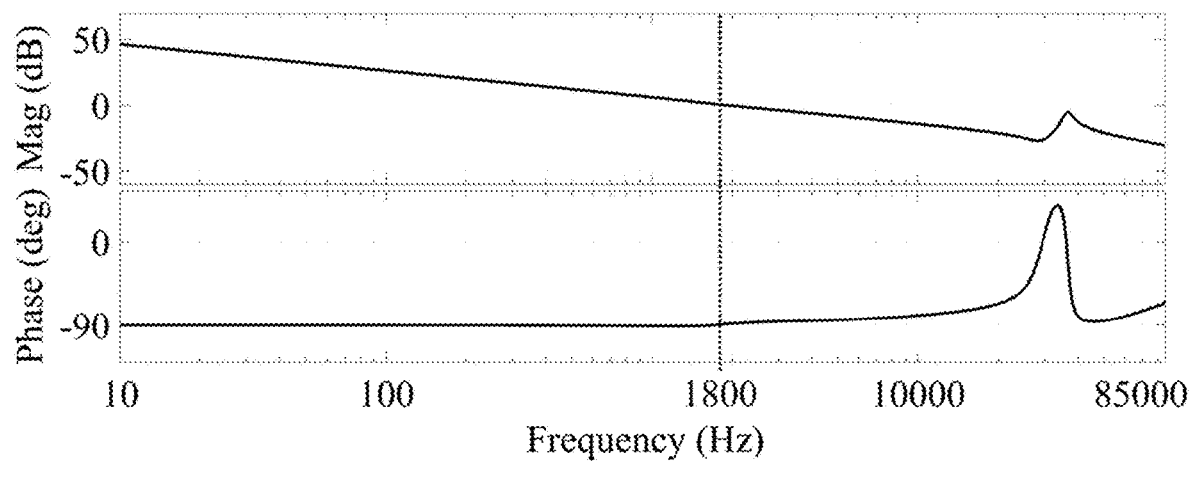
Figure 25:
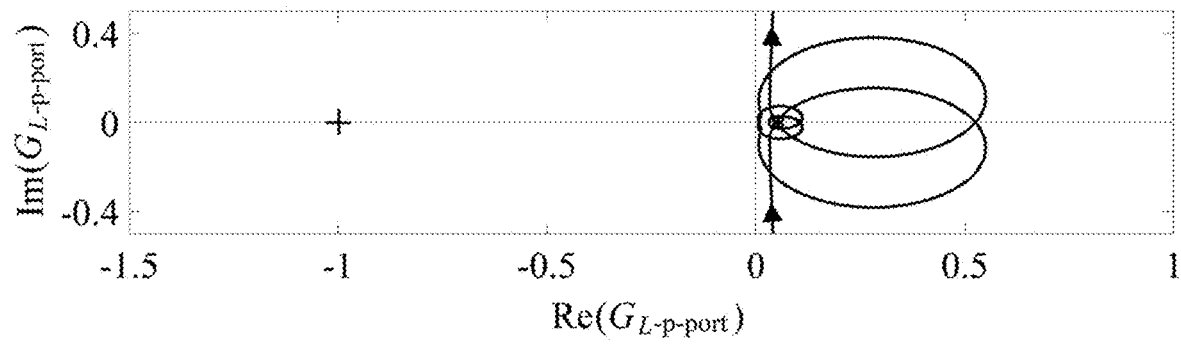

C. Unfolding-Based AC-DC System Operation with the Current Emulation-Based Active Damping The hardware prototype of the unfolding-based AC-DC system is tested at an output power of 20 kW, incorporating current emulation-based active damping ($R_{damp-emu}=9\Omega$) to mitigate the effects of LC resonance on power delivery. Initially, the closed-loop bandwidth of the T-type bridge-based DC-DC converter control is set to 1.8 kHz, close to the LC resonant frequency of 1.77 kHz. In FIG. 25(a), hardware results depict the stable 3-ϕ AC input voltages, grid currents, DC-link voltages, and the output battery current. Both the battery and grid currents show significant improvements and do not have any LC oscillations, even with the closed-loop bandwidth maintained in close proximity to the resonance. A low grid current THD of 2.26% is achieved in this case, as shown in FIG. 25(b). The corresponding Bode plots of the loop transfer function, $G_{L-p-terminal}$, with a gain-crossover frequency of 1.8 kHz and 90.7° phase margin are illustrated in FIG. 25(c). The accompanying Nyquist plot presented in FIG. 25(d), which does not encircle the point (−1, j0), confirms the stability of the closed-loop operation at a bandwidth level of 1.8 kHz.

Figure 26:
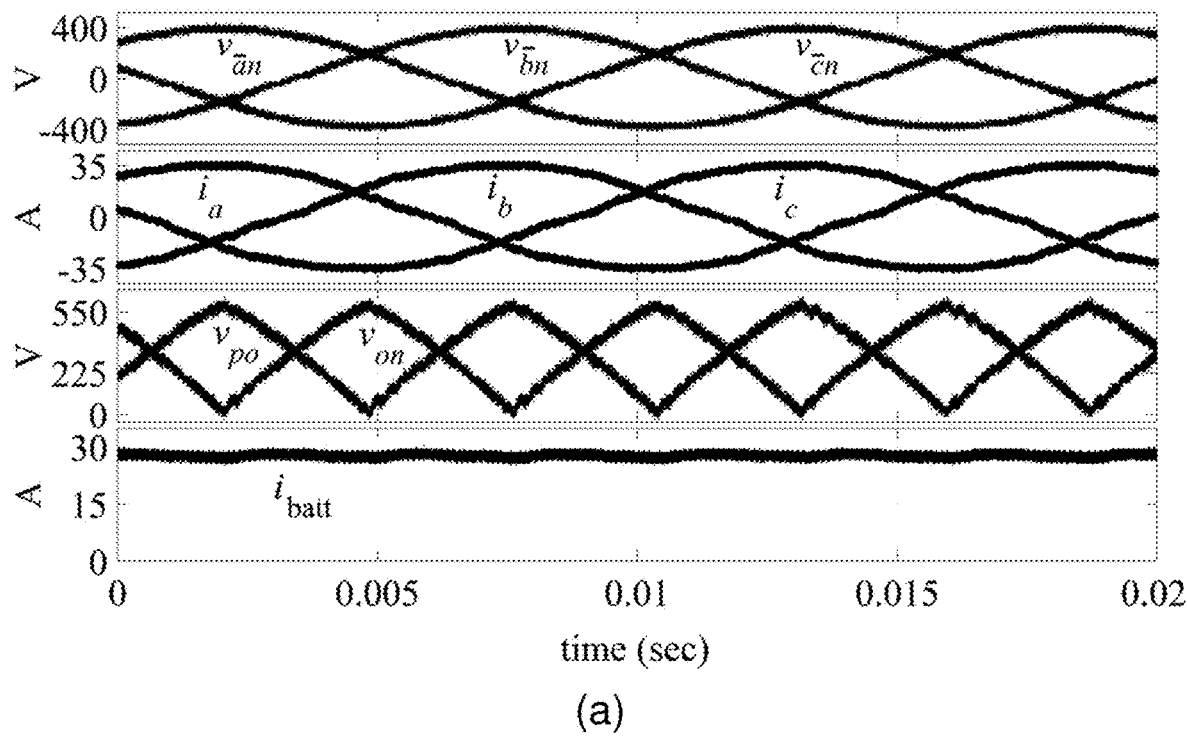
FIG. 26 depicts experimental results of the 20-kW unfolding-based AC-DC system operating at a closed-loop bandwidth of 3 kHz with active damping are illustrated as follows: (a) stable 3-ϕ ac input voltages, grid currents, DC-link voltages, and output battery current; (b) a low grid current THD of 2.29%, measured using the Yokogawa WT1806E power analyzer, (c) Bode plots of the loop transfer function, $G_{L\text{-}p\text{-}terminal}$, indicating a positive phase margin at the gain crossover frequency of 3 kHz ($G_{PI}$ parameters: $K_{p\text{-}PI}=0.001$ and $K_{i\text{-}PI}=380.1$), and (d) the corresponding Nyquist plot, which does not encircle the point (−1, j0), confirming a stable closed-loop operation, according to various embodiments.
Figure 26:
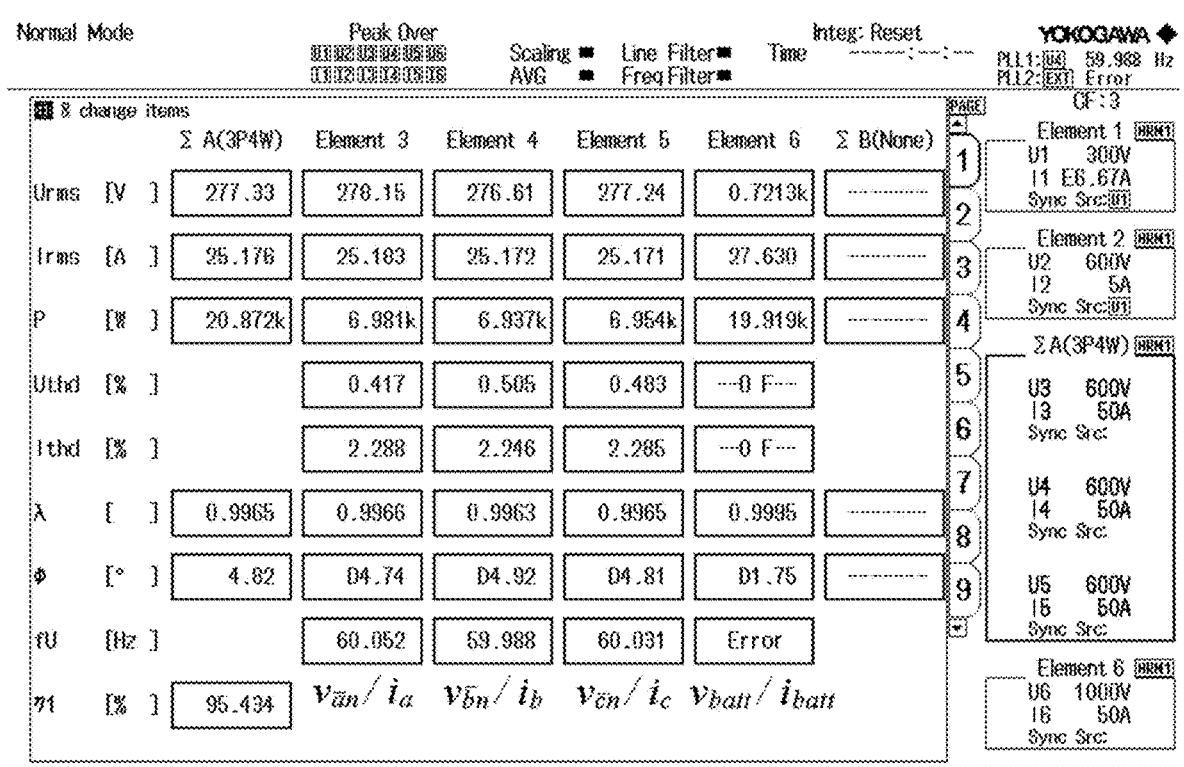
Figure 26:
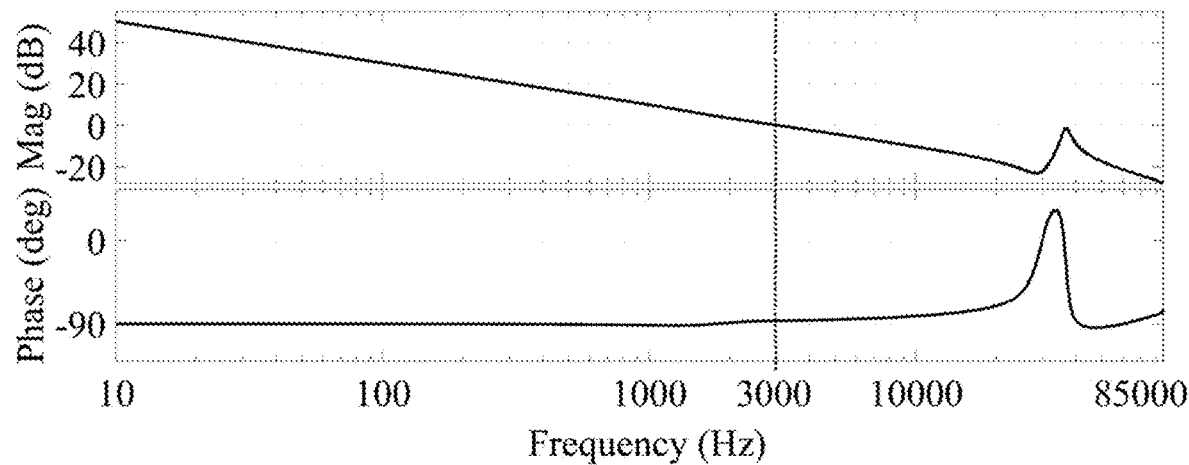
Figure 26:
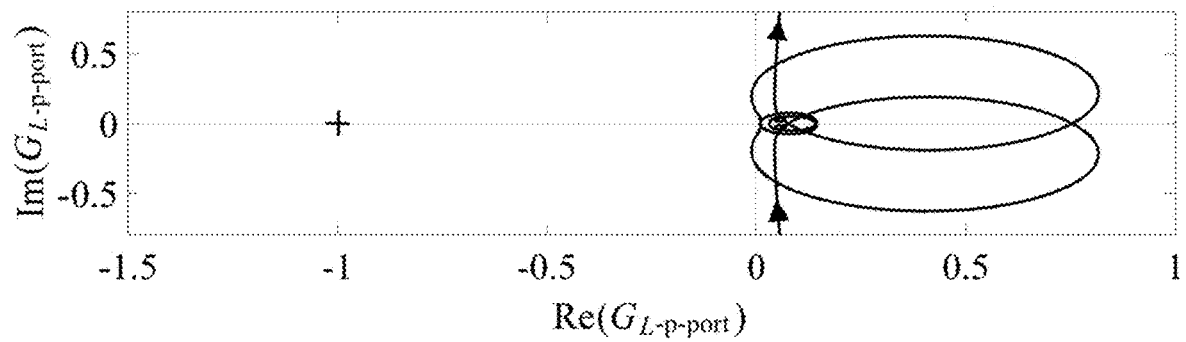
Figure 27:
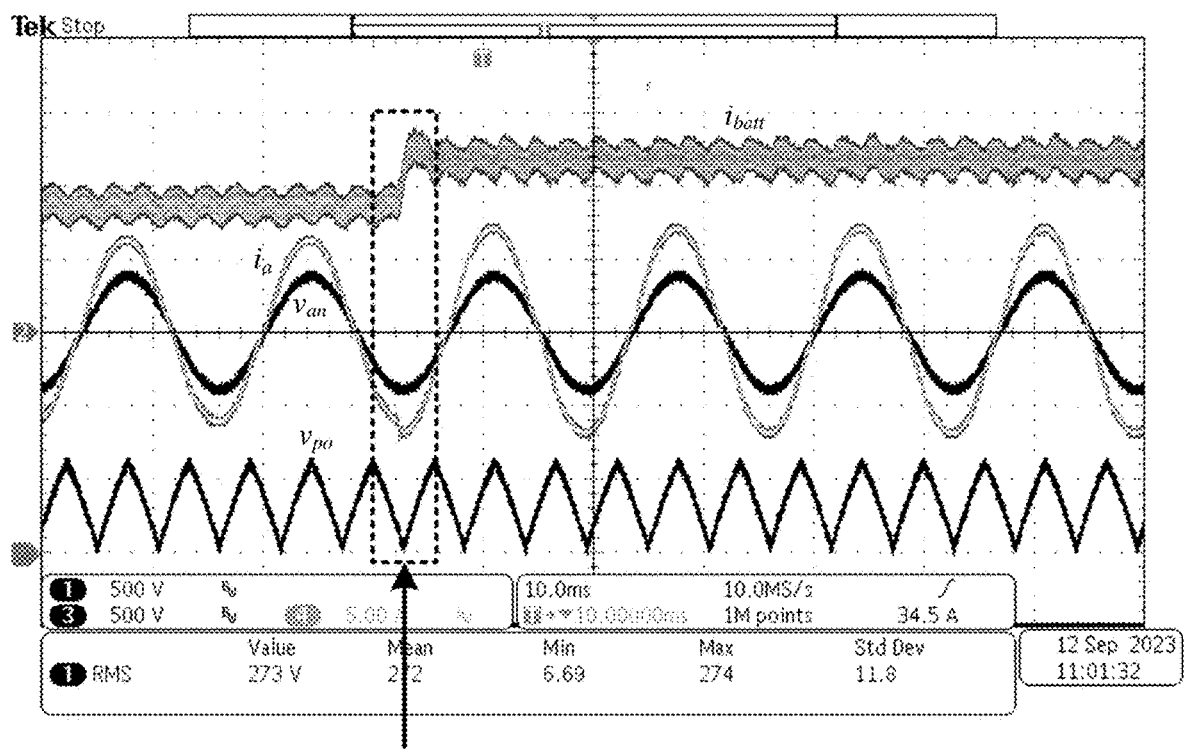
FIG. 27 depicts experimental results with an experimental step change in the output power is given from 17.5 kW to 20 kW by adjusting the amplitudes of the T-type bridge input currents, $i_p$ and $i_n$, from 30 A to 35 A at the closed-loop bandwidth of 3 kHz, where the step change causes a step increase in grid currents as well, transitioning from 30 A peak to 35 A peak and where the battery current also undergoes a step change from 24.3 A to 27.8 A and depicting that a stable transient response is achieved, according to various embodiments.

Additionally, the closed-loop bandwidth of the T-type bridge-based DC-DC converter control is further extended to 3 kHz. The unfolding-based AC-DC system continues to exhibit stable operation without any LC oscillations in the currents, as depicted in FIG. 26(a). A low grid current THD of 2.29% is also maintained, as illustrated in FIG. 26(b). The corresponding Bode plots of the loop transfer function, $G_{L-p-terminal}$, with a gain-crossover frequency of 3 kHz and 93.3° phase margin are presented in FIG. 26(c). Moreover, the associated Nyquist plot shown in FIG. 26(d), which does not encircle the point (−1, j0), confirms the stability of the closed-loop operation at this high bandwidth level. Furthermore, the transient response of the AC-DC system, operating at a bandwidth level of 3 kHz, is assessed by implementing a step change in the output power from 17.5 kW to 20 kW, as depicted in FIG. 27. This adjustment is made by varying the amplitudes of the T-type bridge input currents, $i_p$ and $i_n$, from 30 A to 35 A. This modification leads to a step change in grid-side currents as well, transitioning from 30 A peak to 35 A peak. The battery current also undergoes a step change from 24.3 A to 27.8 A.

Based on the simulation and experimental results, it can be concluded that stable steady-state and transient response are achieved at bandwidth values close to the LC resonance and well above the LC resonant frequency. This is made possible due to the implementation of current emulation-based active damping. The sensing circuits employed for such high bandwidth control are detailed in Appendix B.

TABLE IV

Coefficients of the plant transfer function and single injection driving point impedance.

| Coeff. | Expression | Eq. |
|---|---|---|
| $A_0$ | $2I_{sec-m}^2 I_{xi} K_p L_m V_{po} \omega_s^5 \sin(\pi D_p)(K_p - K_l + 1) - 2K_p V_{po} V_{sec-r} \omega_s^4 \sin(\pi D_p)(P_{ii} - K_l P_{ii} + K_p P_{ii} + K_m P_{rr}) - 2K_p P_{ri} V_{po} V_{sec-r} \omega_s^4 \cos(\pi D_p)(K_l + K_m - K_p - 1) - 2K_p P_{ir} V_{po} V_{sec-r} \omega_s^4 \sin(\pi D_p)(K_l + K_m - K_p - 1) - 2I_{sec-m}^2 I_{xr} K_p L_m V_{po} \omega_s^5 \cos(\pi D_p)(K_p - K_l + 1) - 2K_p V_{po} V_{sec-r} \omega_s^4 \cos(\pi D_p)(P_{rr} + K_m P_{ii} - K_l P_{rr} + K_p P_{rr})$ | (37) |
| $B_0$ | $-I_{xm} K_p^2 L_p \omega_s^5 (L_m \omega_s I_{sec-m}^2 - I_{sec-i} V_{sec-r} + I_{sec-r} V_{sec-i})$ | (38) |
| $B_1$ | $-I_{xm} K_p^2 V_{sec-m} \omega_s^4 (I_{sec-r} \cos(\theta_{sec}) - I_{sec-i} \sin(\theta_{sec}))(2L_m + L_p)$ | (39) |
| $C_0$ | $2K_p V_{po} V_{sec-r} \omega_s^4 \sin(\pi D_p)(P_{ri} - K_m P_{ir} + K_l P_{ri} + K_p P_{ri}) - 2K_p V_{po} V_{sec-r} \omega_s^4 \cos(\pi D_p)(P_{ir} - K_l P_{ir} + K_p P_{ir} - K_m P_{ri}) - 2K_p P_{ii} V_{po} V_{sec-r} \omega_s^4 \cos(\pi D_p)(K_l + K_m - K_p - 1) + 2K_p P_{rr} V_{po} V_{sec-r} \omega_s^4 \sin(\pi D_p)(K_l + K_m - K_p - 1) - 2I_{sec-m}^2 I_{xi} K_p L_m V_{po} \omega_s^5 \cos(\pi D_p)(K_p - K_l + 1) - 2I_{sec-m}^2 I_{xr} K_p L_m V_{po} \omega_s^5 \sin(\pi D_p)(K_p - K_l + 1)$ | (40) |
| $D_0$ | $-I_{xm}^2 K_p^2 L_p \omega_s^5 (L_m \omega_s I_{sec-m}^2 - I_{sec-i} V_{sec-r} + I_{sec-r} V_{sec-i})$ | (41) |
| $D_1$ | $-I_{xm}^2 K_p^2 V_{sec-m} \omega_s^4 (I_{sec-r} \cos(\theta_{sec}) - I_{sec-i} \sin(\theta_{sec}))(2L_m + L_p)$ | (42) |
| $E_0$ | $K_p V_{sec-r} \omega_s^4 \cos(\pi D_p)(P_{ii} - K_l P_{ii} + K_p P_{ii} + K_m P_{rr}) - K_p P_{ir} V_{sec-i} \omega_s^4 (K_l + K_m - K_p - 1) - K_p V_{sec-r} \omega_s^4 (P_{ii} - K_l P_{ii} + K_p P_{ii} + K_m P_{rr}) - K_p V_{sec-r} \omega_s^4 \sin(\pi D_p)(P_{rr} + K_m P_{ii} - K_l P_{rr} + K_p P_{rr}) + I_{sec-m}^2 I_{xi} K_p L_m \omega_s^5 (K_p - K_l + 1) + K_p P_{ir} V_{sec-i} \omega_s^4 \cos(\pi D_p)(K_l + K_m - K_p - 1) - K_p P_{ri} V_{sec-r} \omega_s^4 \sin(\pi D_p)(K_l + K_m - K_p - 1) - I_{sec-m}^2 I_{xi} K_p L_m \omega_s^5 \cos(\pi D_p)(K_p - K_l + 1) - I_{sec-m}^2 I_{xr} K_p L_m \omega_s^5 \sin(\pi D_p)(K_p - K_l + 1)$ | (43) |
| $F_0$ | $-(I_{xm} K_p^2 L_p \omega_s^5 \pi (L_m \omega_s I_{sec-m}^2 - I_{sec-i} V_{sec-r} + I_{sec-r} V_{sec-i}))/2$ | (44) |
| $G_0$ | $K_p V_{sec-r} \omega_s^4 (P_{ri} - K_m P_{ir} + K_l P_{ri} + K_p P_{ri}) + K_p P_{rr} V_{sec-r} \omega_s^4 (K_l + K_m - K_p - 1) - K_p V_{sec-r} \omega_s^4 \cos(\pi D_p)(P_{ri} - K_m P_{ir} + K_l P_{ri} + K_p P_{ri}) - K_p V_{sec-r} \omega_s^4 \sin(\pi D_p)(P_{ir} - K_l P_{ir} + K_p P_{ir} - K_m P_{ri}) - I_{sec-m}^2 I_{xr} K_p L_m \omega_s^5 (K_p - K_l + 1) - K_p P_{rr} V_{sec-r} \omega_s^4 \cos(\pi D_p)(K_l + K_m - K_p - 1) + K_p P_{ii} V_{sec-r} \omega_s^4 \sin(\pi D_p)(K_l + K_m - K_p - 1) + I_{sec-m}^2 I_{xr} K_p L_m \omega_s^5 \cos(\pi D_p)(K_p - K_l + 1) - I_{sec-m}^2 I_{xi} K_p L_m \omega_s^5 \sin(\pi D_p)(K_p - K_l + 1)$ | (45) |
| $H_0$ | $-(I_{xm}^2 K_p^2 L_p \omega_s^5 \pi (L_m \omega_s I_{sec-m}^2 - I_{sec-i} V_{sec-r} + I_{sec-r} V_{sec-i}))/2$ | (46) |

APPENDIX

A. Coefficient of the Plant Transfer Function and Single Injection Driving Point Impedance The coefficients of the plant transfer function and single injection driving point impedance derived in Section IV for the T-type bridge-based DC-DC conversion system 408 are given in TABLE IV, where $$K_p = C_{ps} L_p \omega_s^2, \quad (47)$$

$$K_l = C_{ps} L_l \omega_s^2, \quad (48)$$

$$K_m = C_{ps} L_m \omega_s^2, \quad (49)$$

$$P_{rr} = I_{xr} I_{sec-r}, \quad (50)$$

$$P_{ii} = I_{xi} I_{sec-i}, \quad (51)$$

$$P_{ri} = I_{xr} I_{sec-i}, \quad (52)$$

$$P_{ir} = I_{xi} I_{sec-r}. \quad (53)$$

B. Voltage and Current Sensing Circuits for High-Bandwidth Control

Figure 28:
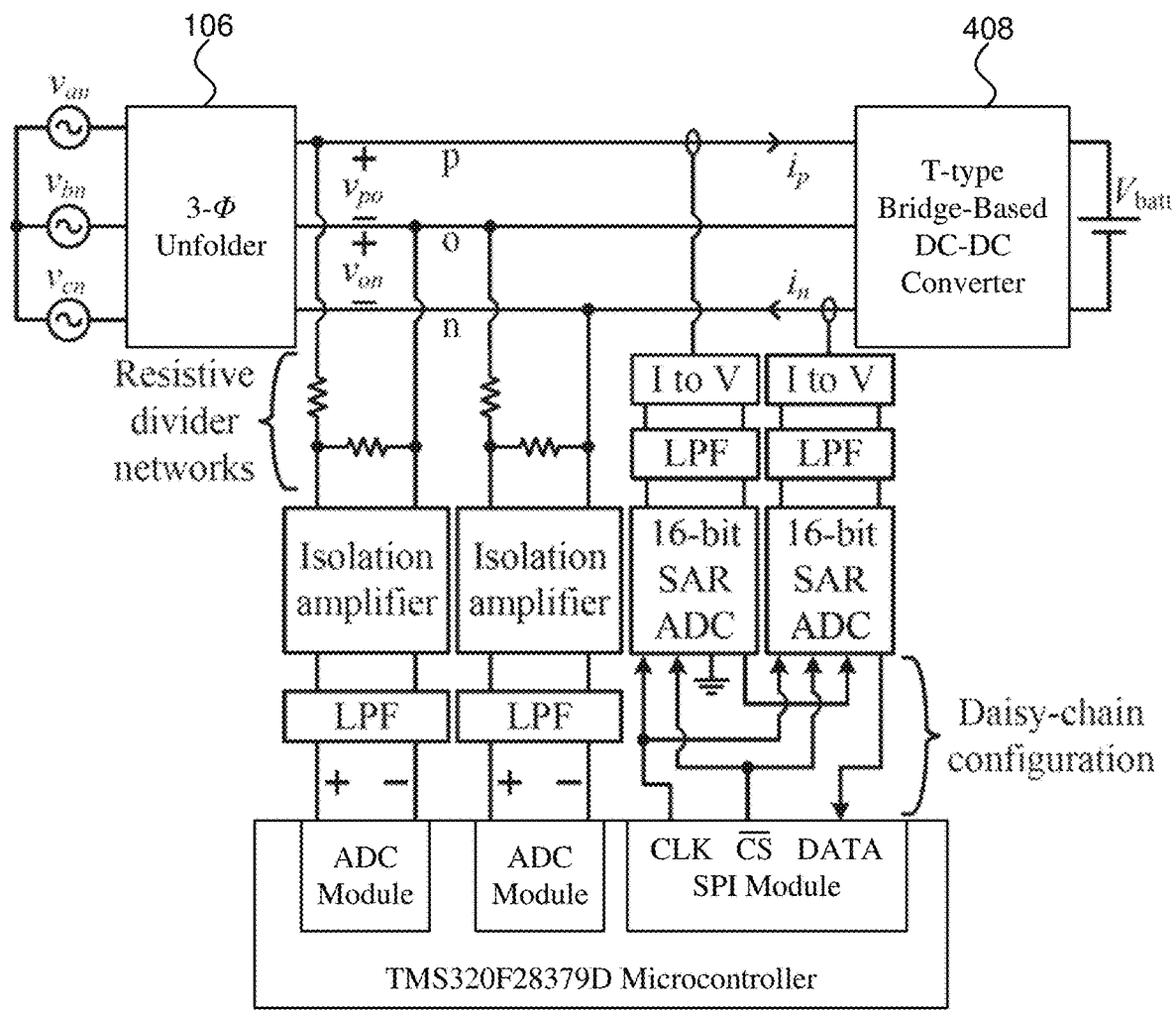
FIG. 28 is a schematic block diagram illustrating a structure of the voltage and current sensing circuits used for high-bandwidth control of the unfolding-based AC-DC system where the sensed voltages, $v_{po}$ and $v_{on}$, and the sensed currents, $i_p$ and $i_n$, are utilized for the feedforward and feedback controls shown in FIG. 16, according to various embodiments.

The voltages $v_{po}$ and $v_{on}$ are sensed for the feedforward control depicted in FIG. 16, employing resistive divider networks. These sensed voltages are subsequently galvanically isolated using the isolation amplifier, ACPL-C870-500E from Broadcom Limited, and directed towards a low-pass filter (LPF) with a 20 kHz cutoff frequency. This cutoff frequency is set to be more than ten times greater than the LC resonant frequency and sufficiently below the switching frequency of the DC-DC converter. The filtered analog signals undergo digital conversion utilizing the 12-bit analog-to-digital converter (ADC) module integrated within the Texas Instruments microcontroller TMS320F28379D. The complete voltage sensing structure is illustrated in FIG. 28.

The currents $i_p$ and $i_n$ are sensed for the feedback control, as illustrated in FIG. 16, utilizing CASR50-NP current sensors from LEM USA Inc., which provide equivalent analog voltage signals. These analog signals are passed through a low pass filter (LPF) with a cutoff frequency of 30 kHz, which is ten times higher than the maximum closed-loop bandwidth and sufficiently below the DC-DC converter switching frequency. The filtered analog signals are then converted into digital signals through a 16-bit successive approximation register (SAR) type analog-to-digital converter (ADC), specifically the ADS8318IDGST from Texas Instruments. Subsequently, these digital signals are interconnected in a daisy-chain configuration and communicated to the microcontroller via the serial peripheral interface (SPI) protocol. The overall current sensing structure is presented in FIG. 28.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an unfolder comprising three input terminals that connect to a three-phase alternating current ("AC") power source with grid inductances and comprising three unfolder output terminals comprising a p-terminal, an n-terminal and an o-terminal;
a three-port converter connected to the three output terminals of the unfolder, the three-port converter configured to feed power to a direct current ("DC") load connected to converter output terminals of the three-port converter, wherein the three-port converter comprises input capacitors across three three-port converter input terminals;
a feedback control loop comprising outputs of a p-terminal modulation index $m_p$ derived from a difference between p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$;
a feedforward control loop comprising outputs of an emulated p-terminal current $i_{p\text{-}emu}$ derived from a difference between a p-terminal direct current ("DC")-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage $v_{on}$ measured across the o-terminal and the n-terminal and an ideal n-terminal DC-link voltage $v_{on\text{-}ideal}$; and
a duty cycle controller configured to generate duty cycles controlling the switches of the three-port converter, the duty cycles derived from the p-terminal modulation index $m_p$, the emulated p-terminal current $i_{p\text{-}emu}$, the n-terminal modulation index $m_n$, and the emulated n-terminal current $i_{n\text{-}emu}$.

2. The apparatus of claim 1, wherein the feedforward control loop is configured to emulate damping resistors configured to damp a resonance formed between grid inductances and the input capacitors.

3. The apparatus of claim 1, wherein the feedforward control loop is configured to maintain a positive control phase margin and a stable feedback control loop at bandwidth values lower than the resonant frequency of grid inductances and the input capacitors of the three-port converter.

4. The apparatus of claim 1, wherein the feedforward control loop is configured to maintain a positive control phase margin and a stable feedback control loop at bandwidth values higher than the resonant frequency.

5. The apparatus of claim 1, wherein the ideal p-terminal DC-link voltage $v_{po\text{-}ideal}$ and the ideal n-terminal DC-link voltage $v_{on\text{-}ideal}$ comprise two ideal unipolar piece-wise sinusoidal DC voltage waveforms offset from each other by a half of a period.

6. The apparatus of claim 5, wherein the unfolder converts bipolar AC voltages into two unipolar piece-wise sinusoidal DC voltage waveforms offset from each other by a half of a period, which are present at the three output terminals of the unfolder, wherein the two unipolar piece-wise sinusoidal DC voltage waveforms are affected by oscillating voltages and currents caused due to a resonance associated with grid inductances of the three-phase AC power source and the input capacitors.

7. The apparatus of claim 5, wherein the ideal two unipolar piece-wise sinusoidal DC voltage waveforms offset from each other by a half of a period comprise a scaled representation of an idealized positive portion of each of three line-voltages of the three-phase AC power source realized across the p-terminal and the o-terminal and across the o-terminal and the n-terminal without oscillations caused by a resonance between grid inductances from the three-phase AC power source and the input capacitors.

8. The apparatus of claim 1, wherein the p-terminal reference current $i_{p\text{-}ref}$ and the n-terminal reference current in-ref comprise a scaled representation of an idealized p-terminal current $i_p$ and an idealized n-terminal current $i_n$ without oscillations caused by a resonance between grid inductances from the three-phase AC power source and capacitance of the input capacitors.

9. The apparatus of claim 1, wherein the duty cycles comprise a p-terminal duty cycle $d_p$ and an n-terminal duty cycle $d_n$ wherein:

$$d_p = \frac{2}{\pi}\sin^{-1}\left(m_p\left(\sin(f_p(\theta_{grid})) - \frac{i_{p\text{-}emu}}{I_{gm}}\right)\right); \text{ and}$$

$$d_n = \frac{2}{\pi}\sin^{-1}\left(m_n\left(\sin(f_n(\theta_{grid})) - \frac{i_{n\text{-}emu}}{I_{gm}}\right)\right),$$

where:
$\theta_{grid}$ is a current position in a period of a phase of the three-phase AC power source;
$I_{gm}$ is a peak grid current;
$m_p = G_{PI}(i_{p\text{-}ref} - i_p)$; and
$m_n = G_{PI}(i_{n\text{-}ref} - i_n)$, where GPI comprises compensation from a proportional-integral ("PI") compensation;
$i_{p\text{-}emu} = k_{emu}(v_{po\text{-}ideal} - v_{po})$;
$i_{n\text{-}emu} = k_{emu}(v_{on\text{-}ideal} - v_{on})$;
$k_{emu}$ is a proportionality constant; and
$f_p$ and $f_n$ are functions according to:

| Sector | $\theta_{grid}$ grid angle | $f_p$ | $f_n$ |
|---|---|---|---|
| I | $0 \leq \theta_{grid} < \pi/3$ | $\theta_{grid} + \pi/2$ | $\theta_{grid} + \pi/6$ |
| II | $\pi/3 \leq \theta_{grid} < 2\pi/3$ | $\theta_{grid} - \pi/6$ | $\theta_{grid} + \pi/6$ |
| III | $2\pi/3 \leq \theta_{grid} < \pi$ | $\theta_{grid} - \pi/6$ | $\theta_{grid} - \pi/2$ |
| IV | $\pi \leq \theta_{grid} < 4\pi/3$ | $\theta_{grid} - 5\pi/6$ | $\theta_{grid} - \pi/2$ |
| V | $4\pi/3 \leq \theta_{grid} < 5\pi/3$ | $\theta_{grid} - 5\pi/6$ | $\theta_{grid} - 7\pi/6$ |
| VI | $5\pi/3 \leq \theta_{grid} < 2\pi$ | $\theta_{grid} + \pi/2$ | $\theta_{grid} - 7\pi/6$ |

10. The apparatus of claim 1, wherein the three-port converter comprises a switching section, a resonant tank section, and a rectification section, the resonant tank section comprising one or more resonant tank inductors and one or more resonant tank capacitors and the rectification section comprising output terminals configured to connect to a load and the rectification section configured to rectify a waveform present at an output of the resonant tank section.

11. The apparatus of claim 10, wherein the resonant tank section comprises one of:
a transformer; and
a primary coil and a secondary coil separated from the primary coil by an air gap and wherein the primary coil and the secondary coil are configured for wireless power transfer.

12. The apparatus of claim 1, wherein the duty cycle controller further generates the duty cycles using a current position $\theta_{grid}$ in a period of a phase of the three-phase AC power source.

13. A power converter comprising:
an unfolder comprising an input connection comprising three input terminals that connect to a three-phase alternating current ("AC") power source with grid inductances and comprising an output connection with three unfolder output terminals comprising a p-terminal, an n-terminal and an o-terminal;

a three-port converter connected to the three output terminals of the unfolder, the three-port converter configured to feed power to a direct current ("DC") load connected to converter output terminals of the three-port converter, wherein the three-port converter comprises input capacitors across three three-port converter input terminals and switches that strategically operate to feed DC power to the DC load, the three-port converter comprising a switching section, a resonant tank section, and a rectification section, the resonant tank section comprising one or more resonant tank inductors and one or more resonant tank capacitors and the rectification section comprising the converter output terminals and the rectification section configured to rectify a waveform present at an output of the resonant tank section;

a feedback control loop comprising outputs of a p-terminal modulation index $m_p$ derived from a difference between a p-terminal current $i_p$ and a p-terminal reference current $i_{p\text{-}ref}$ and an n-terminal modulation index $m_n$ derived from a difference between an n-terminal current $i_n$ and an n-terminal reference current $i_{n\text{-}ref}$;

a feedforward control loop comprising outputs of an emulated p-terminal current $i_{p\text{-}emu}$ derived from a difference between a p-terminal direct current ("DC")-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage Von measured across the o-terminal and the n-terminal and an ideal n-terminal DC-link voltage $v_{on\text{-}ideal}$; and a duty cycle controller configured to generate a p-terminal duty cycle $d_p$ controlling a first portion of switches of the three-port converter, the p-terminal duty cycle $d_p$ derived from the p-terminal modulation index $m_p$ and the emulated p-terminal current $i_p$-emu, and an n-terminal duty cycle $d_n$ controlling a second portion of switches of the three-port converter, the n-terminal duty cycle $d_n$ derived from the n-terminal modulation index $m_n$ and the emulated n-terminal current $i_{n\text{-}emu}$.

14. The power converter of claim 13, wherein the three-port converter comprises a T-type bridge.

15. The power converter of claim 13, wherein the feedforward control loop is configured to emulate damping resistors configured to damp a resonance formed between grid inductances and the input capacitors.

16. The power converter of claim 13, wherein the resonant tank section comprises a transformer.

17. The power converter of claim 13, wherein the resonant tank section comprises a primary coil and a secondary coil separated from the primary coil by an air gap and wherein the primary coil and the secondary coil are configured for wireless power transfer.

18. The power converter of claim 13, wherein the feedforward control loop is configured to maintain a positive control phase margin and a stable feedback control loop at bandwidth values lower than the resonant frequency of grid inductances and the input capacitors of the three-port converter.

19. The power converter of claim 13, wherein the feedforward control loop is configured to maintain a positive control phase margin and a stable feedback control loop at bandwidth values higher than the resonant frequency.

20. An apparatus comprising:

an unfolder comprising an input connection comprising three input terminals that connect to a three-phase alternating current ("AC") power source with grid inductances and comprising an output connection with three unfolder output terminals comprising a p-terminal, an n-terminal and an o-terminal;

a three-port converter connected to the three output terminals of the unfolder, the three-port converter is configured to feed power to a direct current ("DC") load connected to converter output terminals of the three-port converter, wherein the three-port converter comprises input capacitors across three three-port converter input terminals;

a feedback control loop comprising outputs of a p-terminal modulation index $m_p$ derived from a difference between a p-terminal current $i_p$ and a p-terminal reference current $i_{p\text{-}ref}$ and an n-terminal modulation index $m_n$ derived from a difference between n-terminal current $i_n$ and an n-terminal reference current $i_{n\text{-}ref}$;

a feedforward control loop comprising outputs of an emulated p-terminal current $i_{p\text{-}emu}$ derived from a difference between a p-terminal direct current ("DC")-link voltage $v_{po}$ measured across the p-terminal and the o-terminal and an ideal p-terminal DC-link voltage $v_{po\text{-}ideal}$ and an emulated n-terminal current $i_{n\text{-}emu}$ derived from a difference between an n-terminal DC-link voltage von measured across the o-terminal and the n-terminal and an ideal n-terminal DC-link voltage $v_{on\text{-}ideal}$; and a duty cycle controller configured to generate a p-terminal duty cycle $d_p$ controlling a first portion of switches of the three-port converter, the p-terminal duty cycle $d_p$ derived from the p-terminal modulation index $m_p$ and the emulated p-terminal current $i_{p\text{-}emu}$, and an n-terminal duty cycle $d_n$ controlling a second portion of switches of the three-port converter, the n-terminal duty cycle $d_n$ derived from the n-terminal modulation index $m_n$ and the emulated n-terminal current $i_{n\text{-}emu}$, wherein the feedforward control loop is configured to emulate damping resistors configured to damp a resonance formed between grid inductances and the input capacitors, wherein the ideal p-terminal DC-link voltage $v_{po\text{-}ideal}$ and the ideal n-terminal DC-link voltage $v_{on\text{-}ideal}$ comprise two ideal unipolar piece-wise sinusoidal DC voltage waveforms offset from each other by a half of a period, and wherein the p-terminal reference current $i_{p\text{-}ref}$ comprises and the n-terminal reference current $i_{n\text{-}ref}$ comprises a scaled representation of an idealized p-terminal current $i_p$ and an idealized n-terminal current $i_n$ without oscillations caused by the resonance between the grid inductances from the three-phase AC power source and the input capacitors.

* * * * *